United States Patent [19]
Tanioka et al.

[11] Patent Number: 5,729,624
[45] Date of Patent: Mar. 17, 1998

[54] IMAGE PROCESSING METHOD AND APPARATUS

[75] Inventors: Hiroshi Tanioka; Yasuhiro Yamada, both of Yokohama, Japan

[73] Assignee: Canon Kabushiki Kaisha, Tokyo, Japan

[21] Appl. No.: 115,253

[22] Filed: Sep. 1, 1993

Related U.S. Application Data

[63] Continuation of Ser. No. 717,907, Jun. 19, 1991, abandoned.

[30] Foreign Application Priority Data

Jun. 20, 1990 [JP] Japan ................................ 2-163601
Jun. 20, 1990 [JP] Japan ................................ 2-163602
Jun. 20, 1990 [JP] Japan ................................ 2-163603

[51] Int. Cl.$^6$ ............................................. G06K 9/00
[52] U.S. Cl. ........................ 382/162; 382/199; 382/266
[58] Field of Search ................................ 382/22, 27, 54, 382/17, 199, 205, 254, 164, 165, 266; 358/447, 451

[56] References Cited

U.S. PATENT DOCUMENTS

| | | | |
|---|---|---|---|
| 4,642,681 | 2/1987 | Ikeda | 358/79 |
| 4,700,399 | 10/1987 | Yoshida | 382/17 |
| 4,723,129 | 2/1988 | Endo et al. | 346/1.1 |
| 4,740,796 | 4/1988 | Endo et al. | 246/1.1 |
| 4,827,353 | 5/1989 | Ehlers et al. | |
| 4,853,970 | 8/1989 | Ott et al. | 382/27 |
| 4,857,899 | 8/1989 | Ishii | |
| 4,896,364 | 1/1990 | Lohscheller | 382/27 |
| 4,958,219 | 9/1990 | Kadowaki | 358/80 |
| 4,969,202 | 11/1990 | Groezinger | 382/27 |
| 5,018,217 | 5/1991 | Yoshida et al. | 382/22 |
| 5,029,227 | 7/1991 | Kawamura | 382/54 |
| 5,031,034 | 7/1991 | Shimizu et al. | 358/80 |
| 5,047,844 | 9/1991 | Ikeda et al. | 358/80 |
| 5,062,142 | 10/1991 | Mechley | 382/27 |
| 5,086,487 | 2/1992 | Katayama et al. | 382/27 |
| 5,111,285 | 5/1992 | Fujita et al. | 382/22 |
| 5,113,252 | 5/1992 | Hori et al. | 358/451 |
| 5,119,185 | 6/1992 | Ikeda et al. | 358/80 |
| 5,119,187 | 6/1992 | Ikeda et al. | 358/80 |
| 5,126,838 | 6/1992 | Ohsawa et al. | 358/443 |

FOREIGN PATENT DOCUMENTS

| | | |
|---|---|---|
| 0261764 | 3/1988 | European Pat. Off. |
| 3838730 | 5/1989 | Germany |
| 60-236365 | 11/1985 | Japan |
| 61-227476 | 10/1986 | Japan |
| 62-110364 | 5/1987 | Japan |
| 2022027 | 1/1990 | Japan |

*Primary Examiner*—Joseph Mancuso
*Attorney, Agent, or Firm*—Fitzpatrick, Cella, Harper & Scinto

[57] ABSTRACT

An image processing apparatus and method for processing color image signals is disclosed. The apparatus comprises a first judgment unit for judging whether a pixel of interest belongs to a black line image portion, and outputting a first judgment signal indicating a judgment result, a second judgment unit for judging whether pixels in the vicinity of the pixel of interest belong to a black line image potion, and outputting a second judgment signal indicating a judgment result, and a control unit for controlling recording of the pixel of interest based on the first and second judgment signals outputted from the first and second judgment units. With the apparatus, black lines in a color image are satisfactorily reproduced.

24 Claims, 32 Drawing Sheets

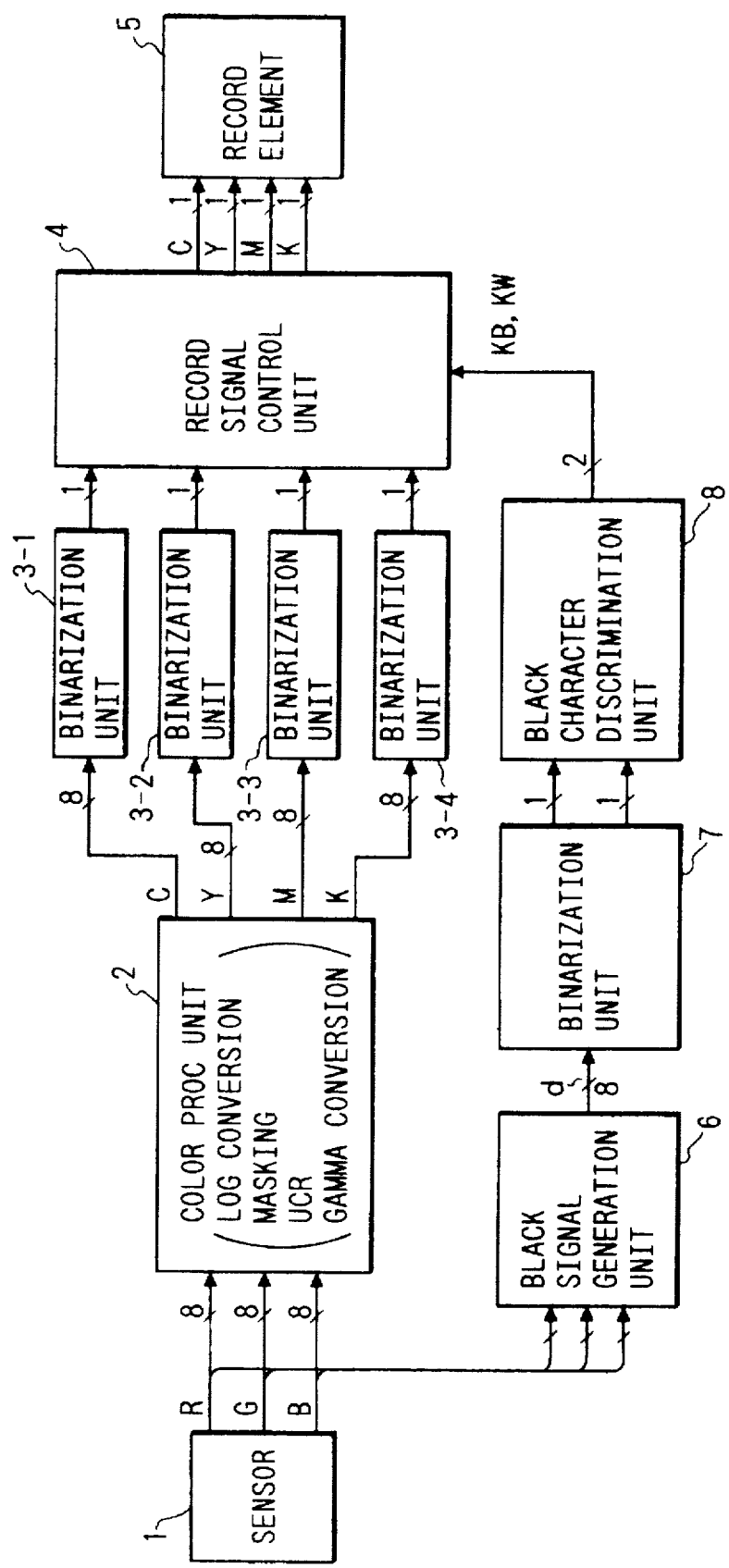

$$d = \max(RGB) + \frac{\max(RGB)}{\beta} \{\max(RGB) - \min(RGB)\}$$

$$d = \max(RGB) \times \frac{\max(RGB)}{\max(RGB) + \gamma}$$

FIG. 9A
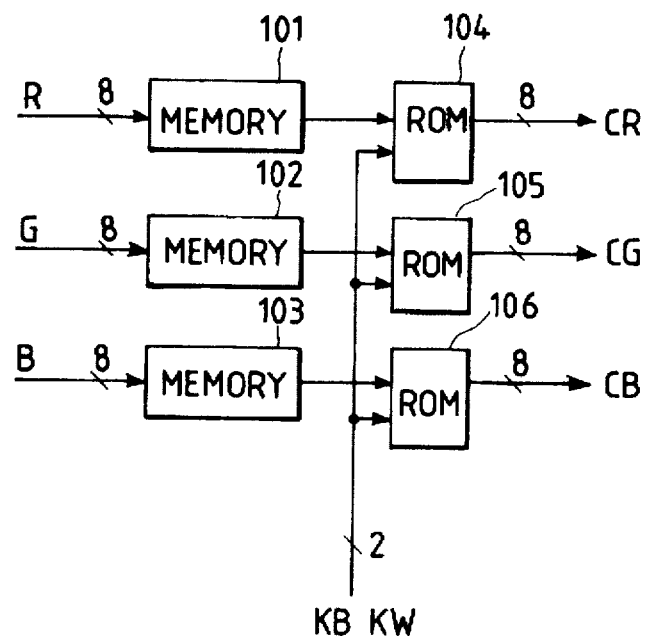
FIG. 9B
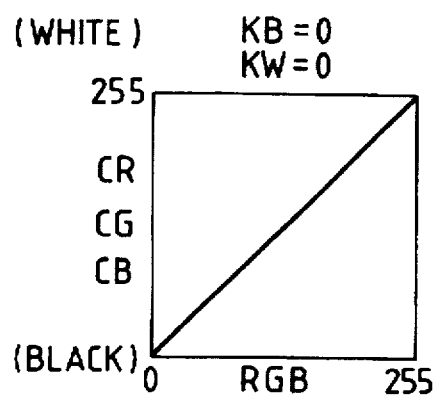
FIG. 9C
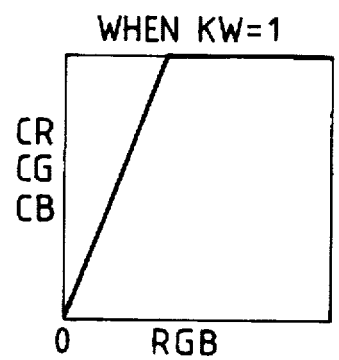
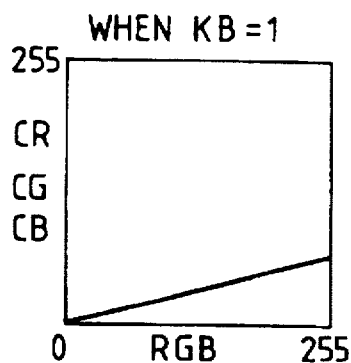
FIG. 9D

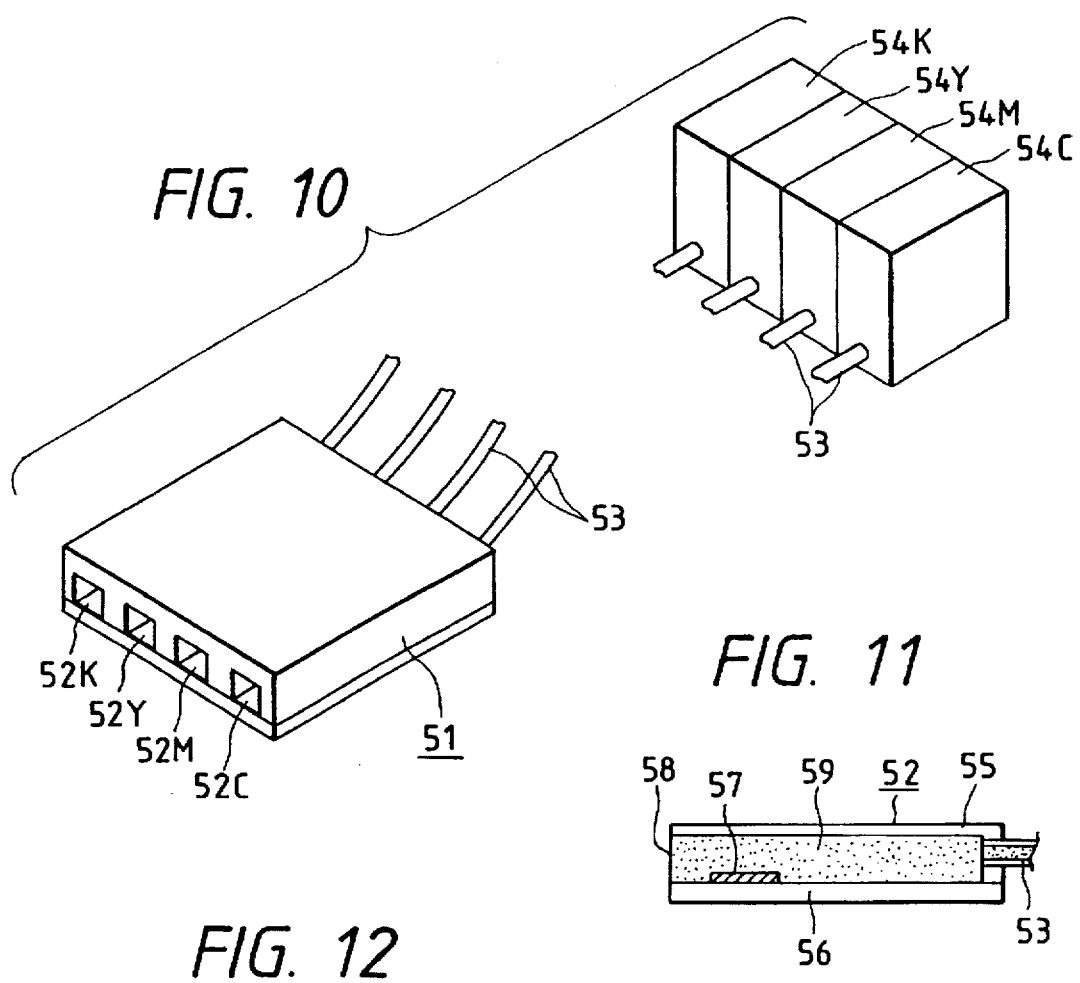
FIG. 10
FIG. 11
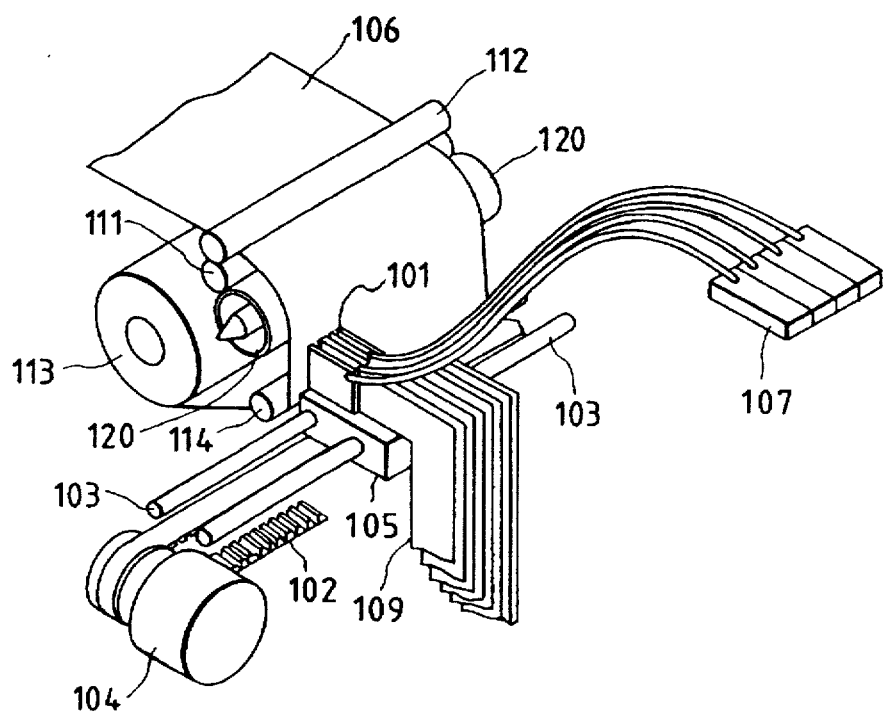
FIG. 12

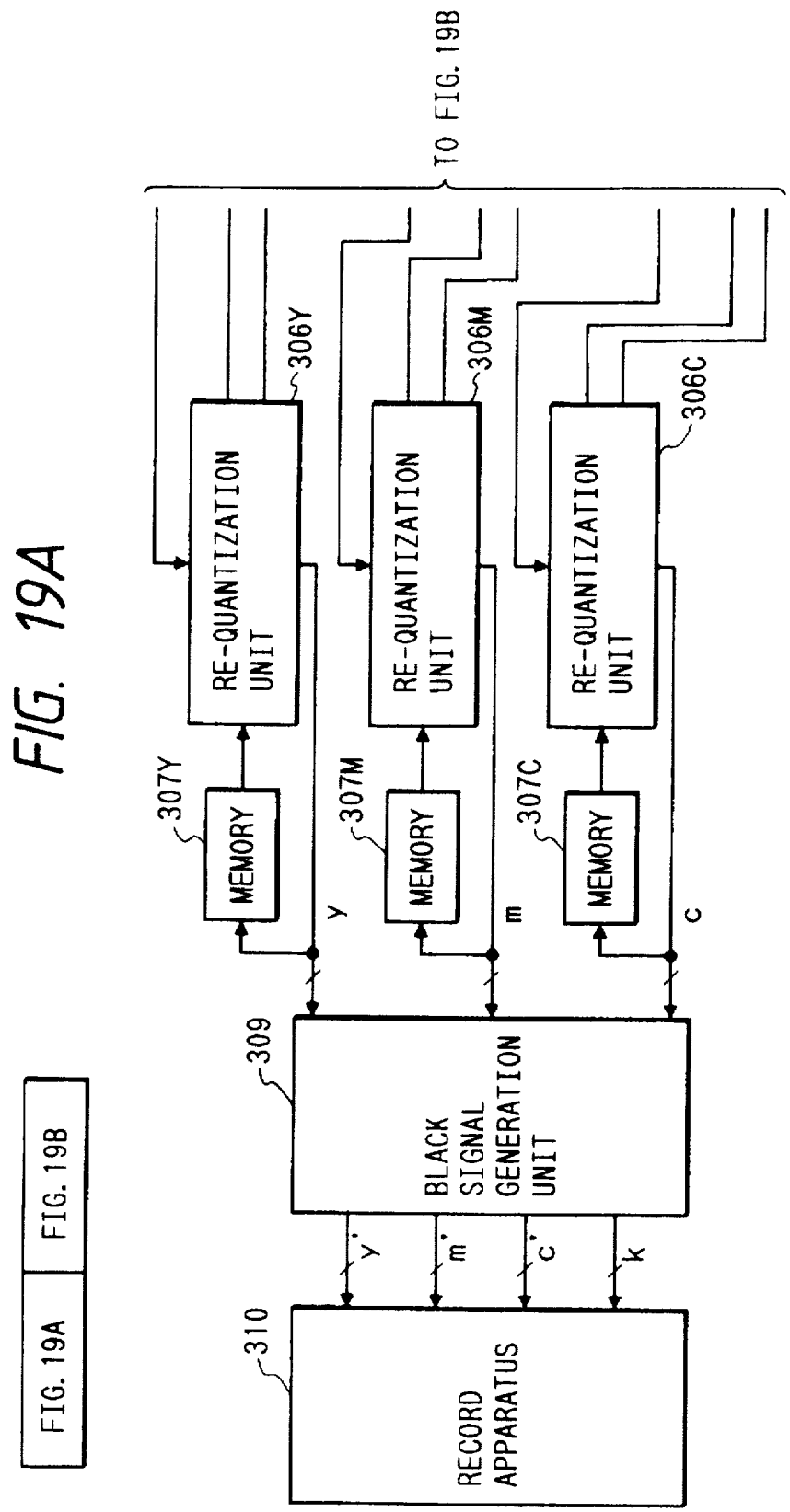

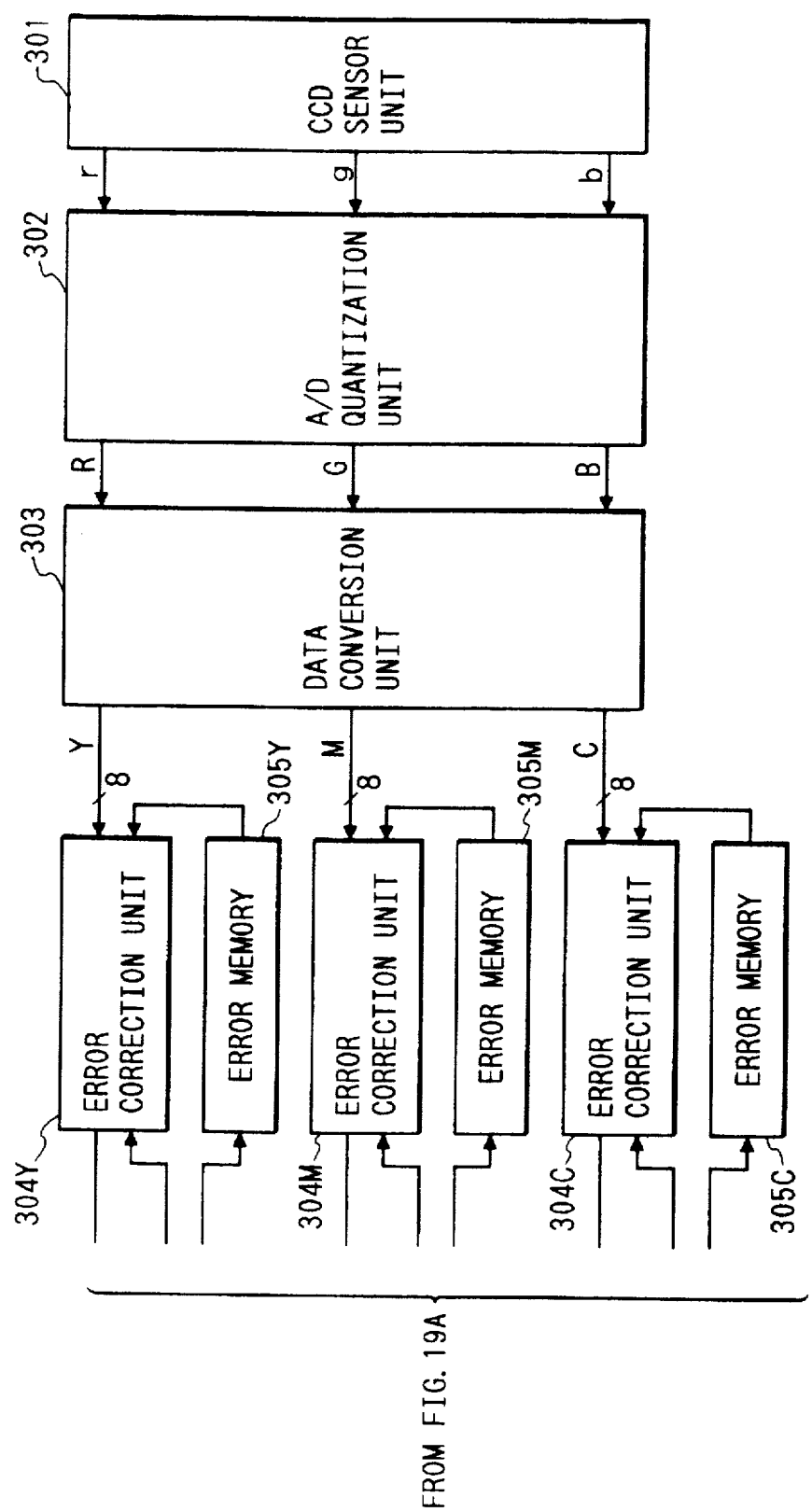

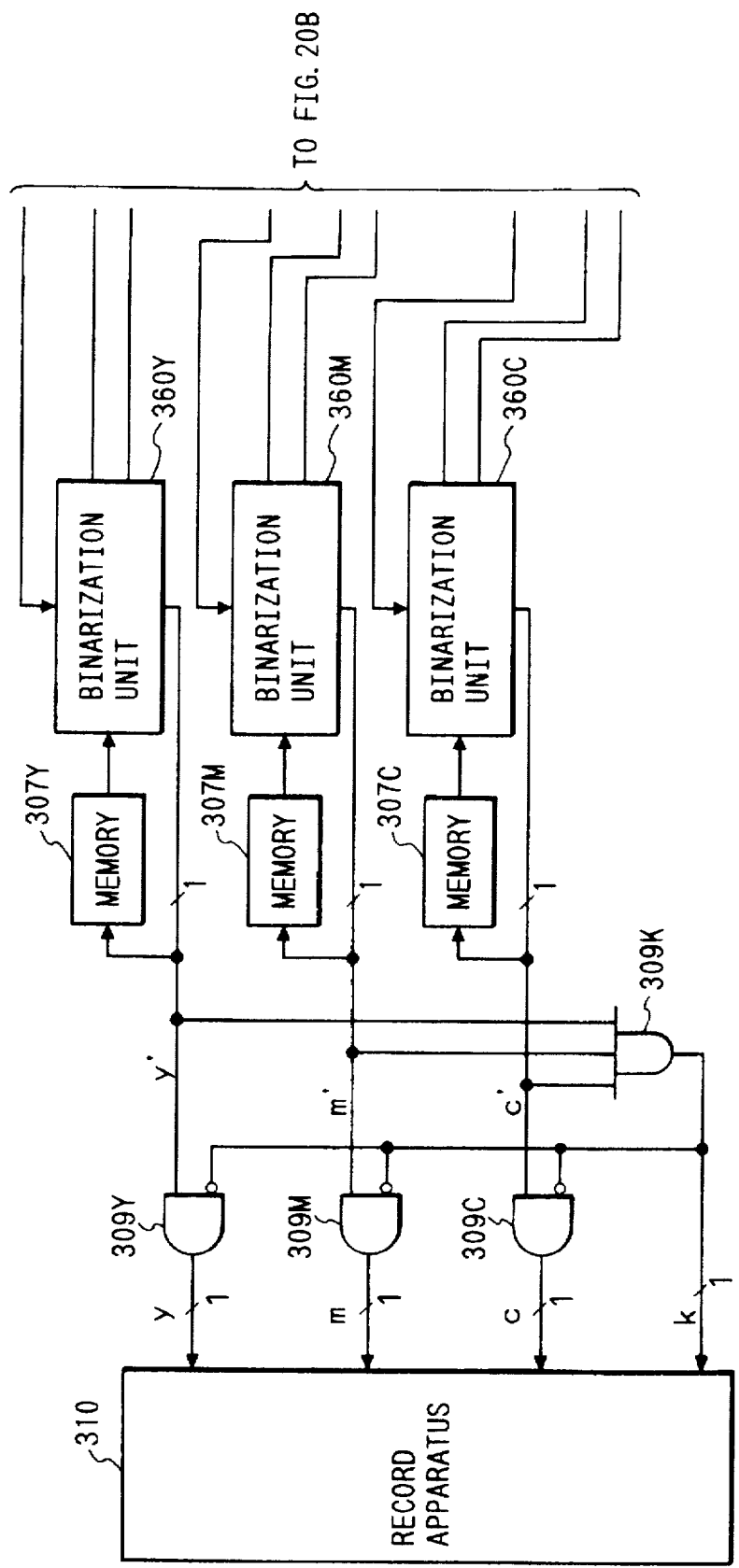

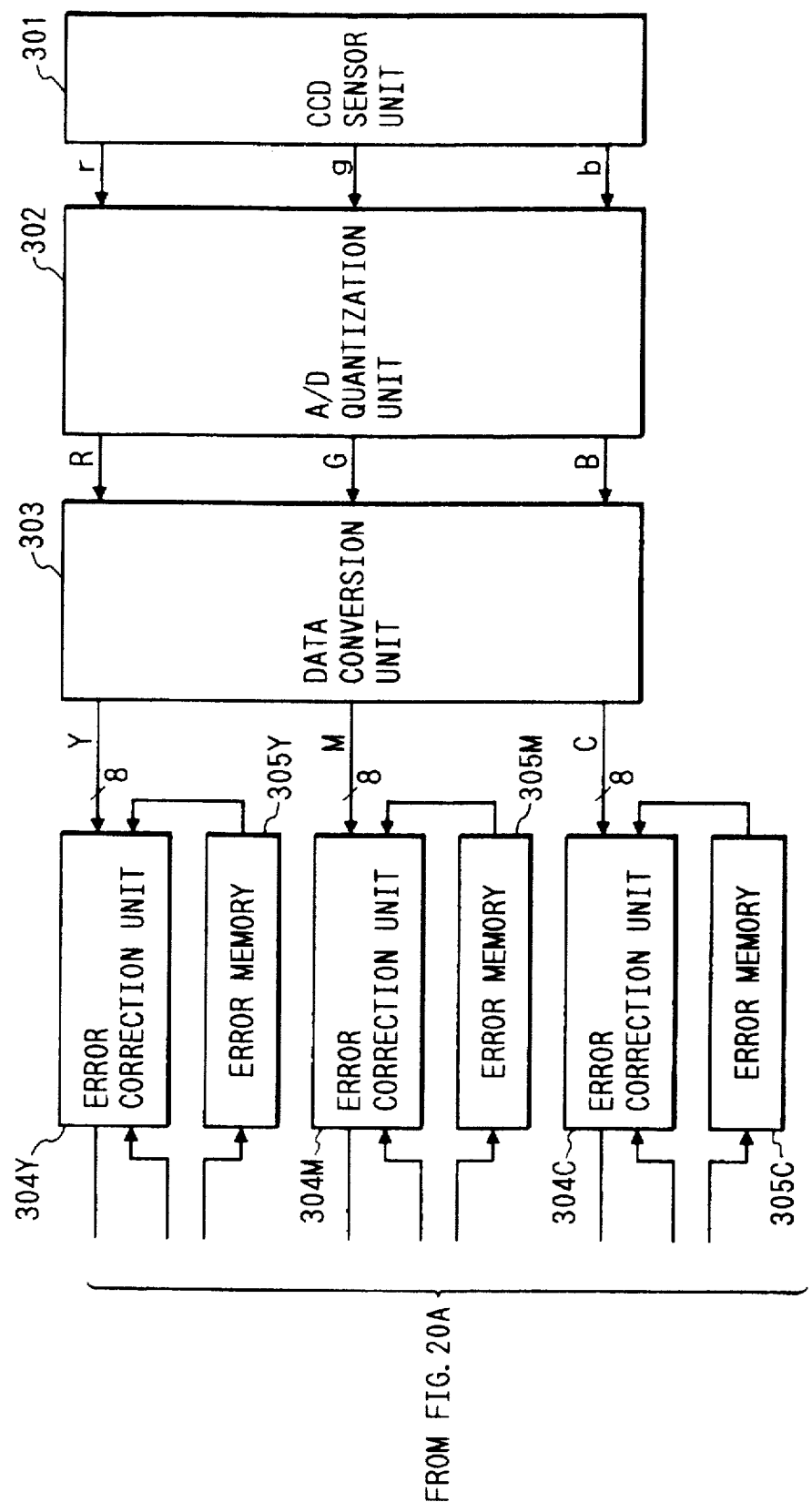

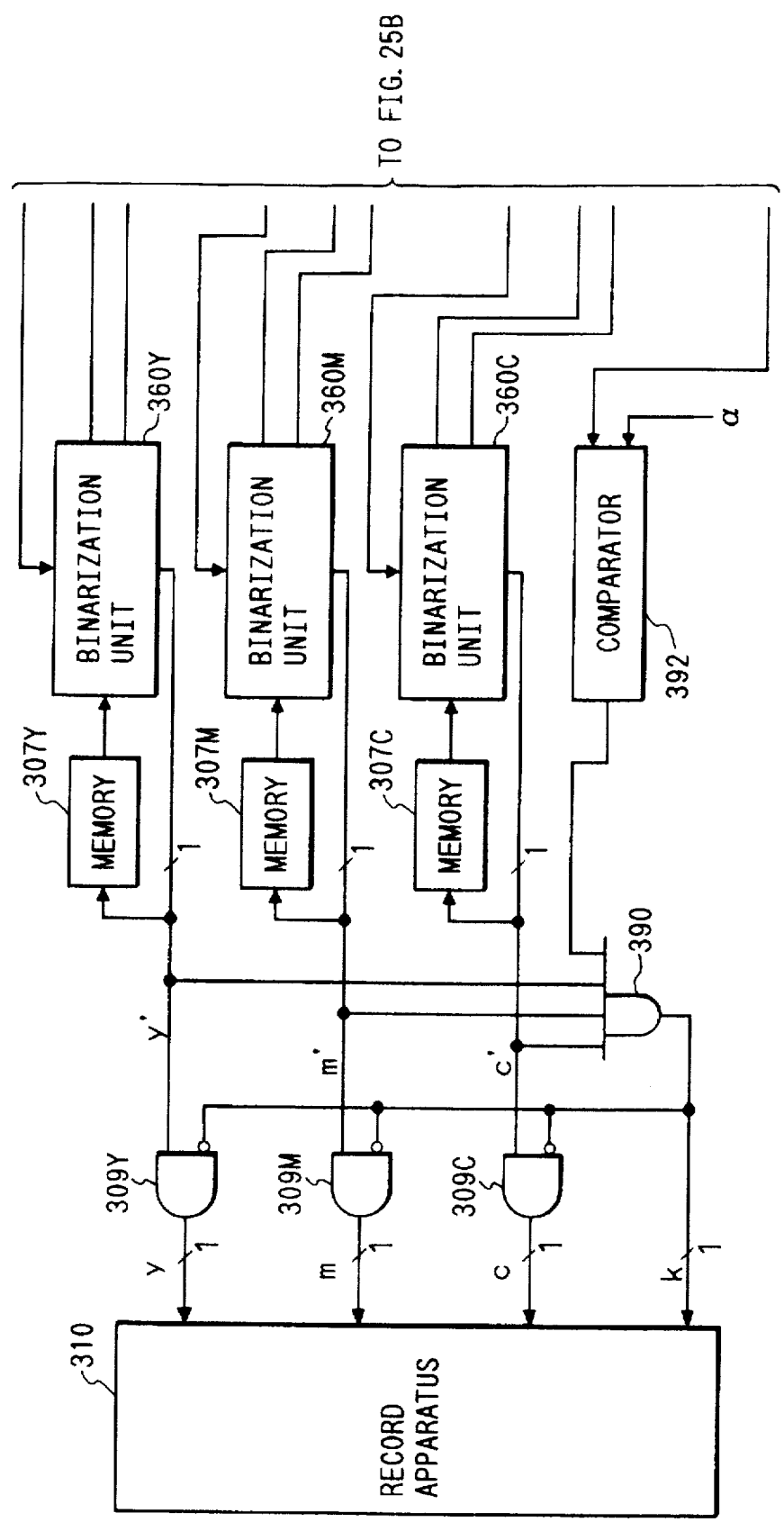

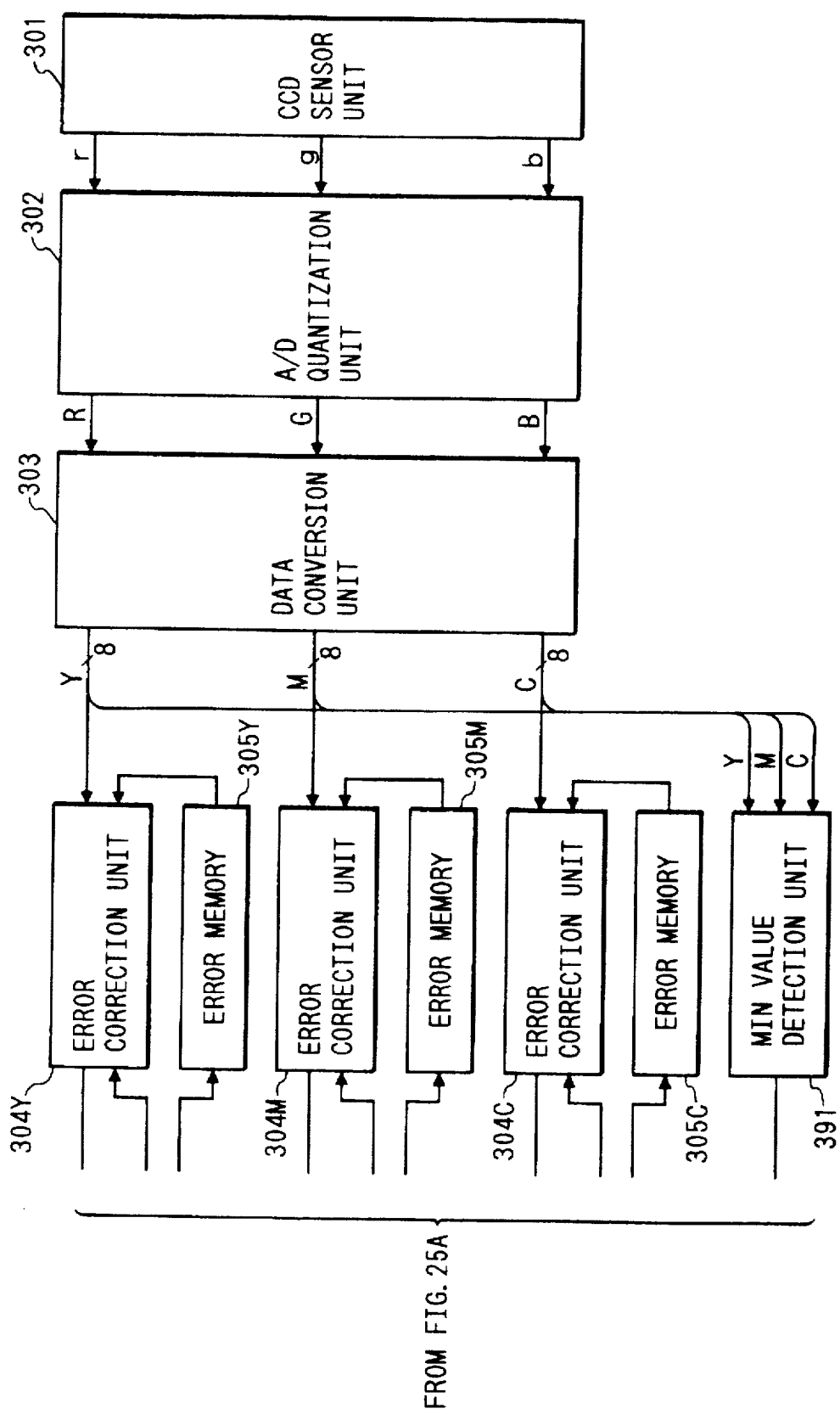

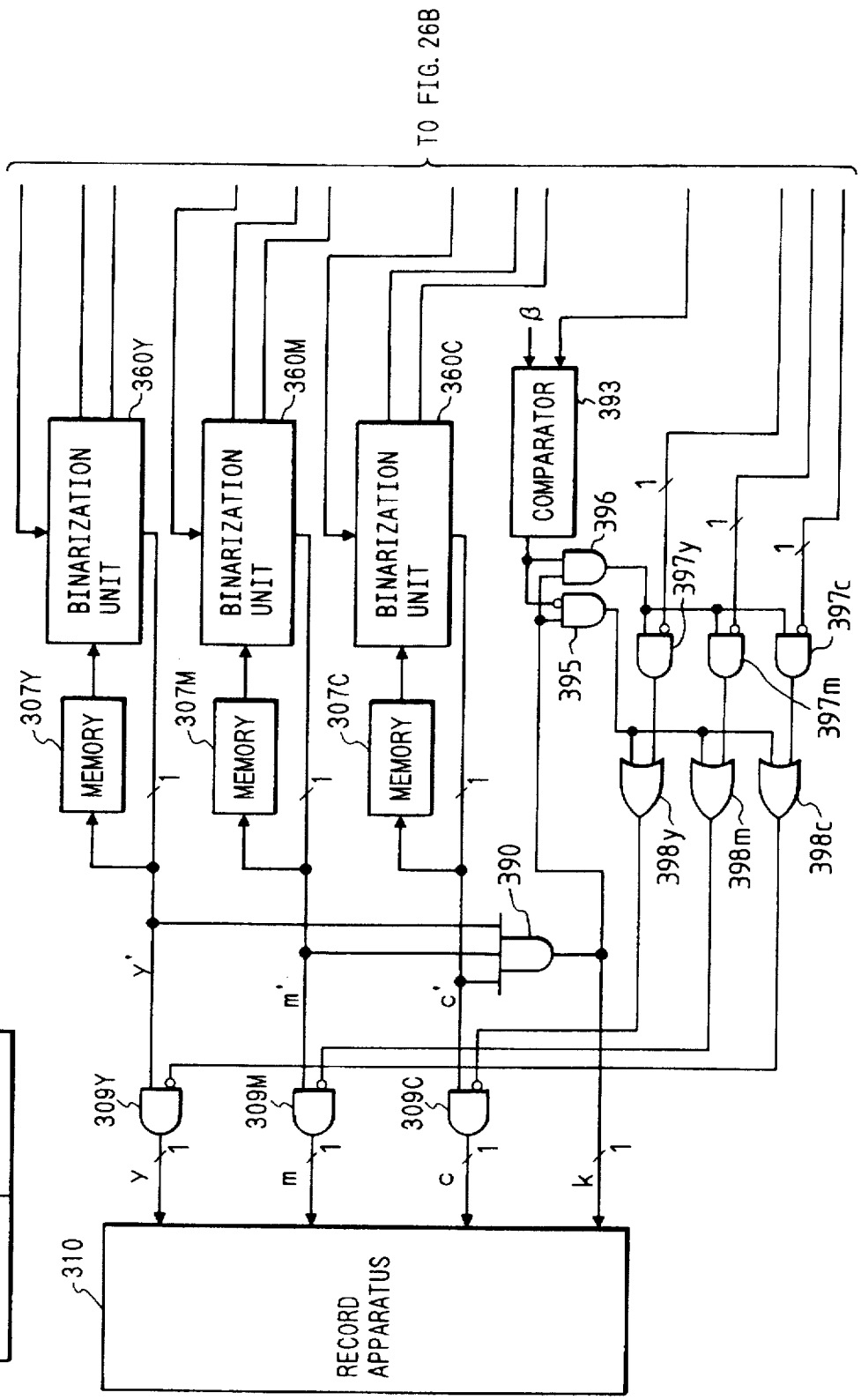

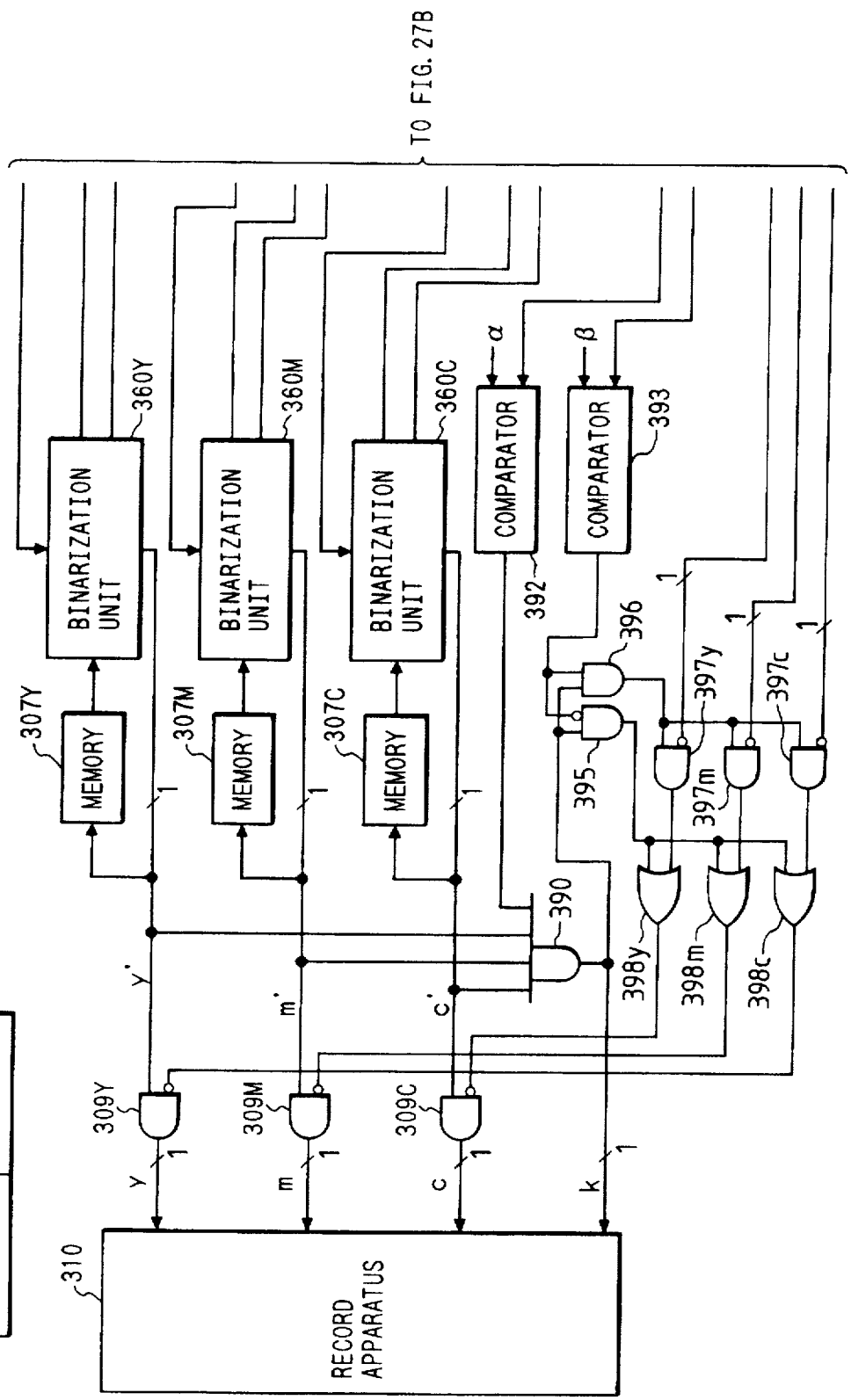

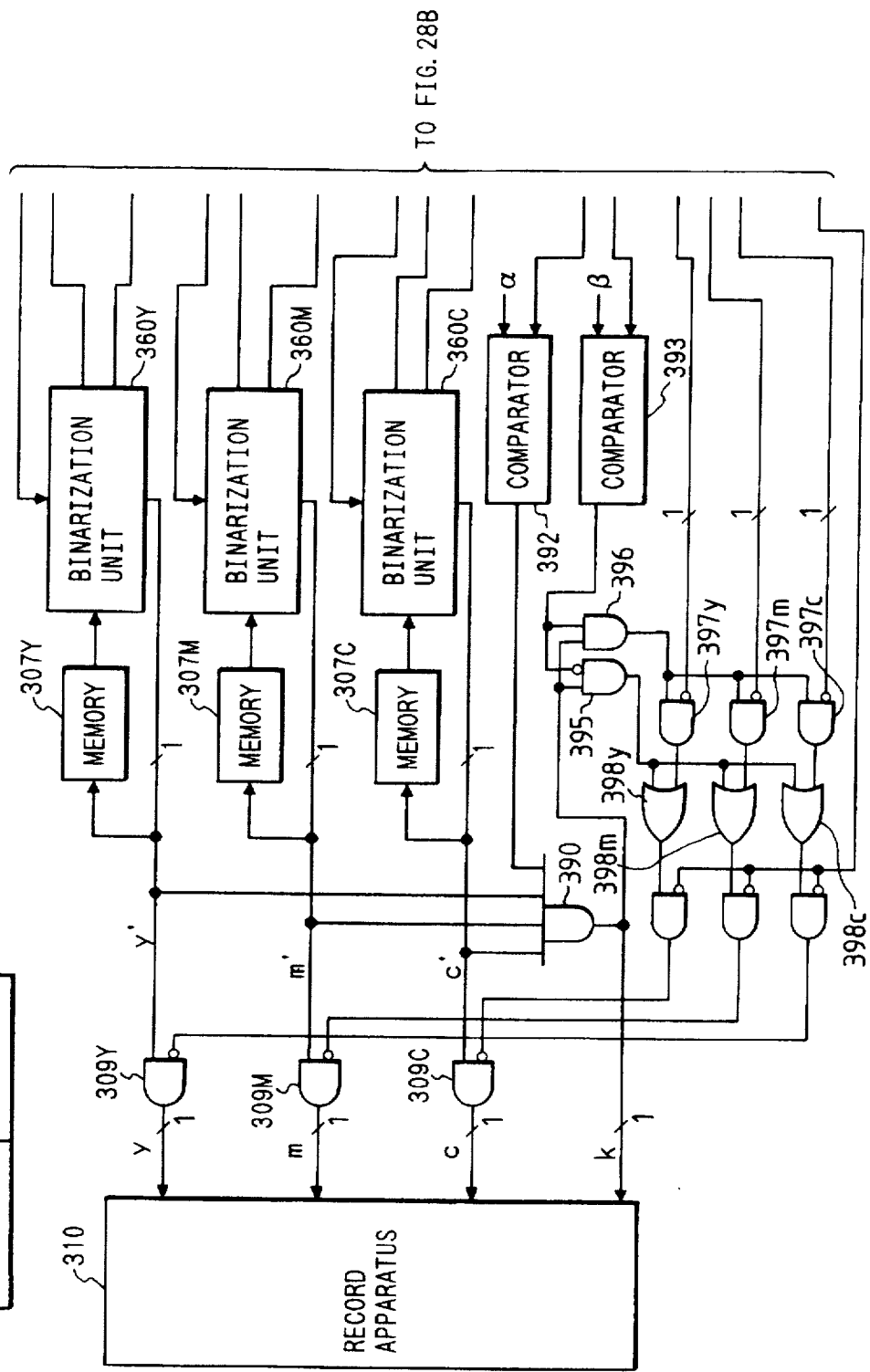

IMAGE PROCESSING METHOD AND APPARATUS

This application is a continuation of application Ser. No. 07/717,907 filed Jun. 19, 1991, now abandoned.

BACKGROUND OF THE INVENTION

1. Field of the Invention

The present invention relates to an image processing apparatus, such as a color copying machine and a color FAX, for processing color image signals to record a color image using recording materials (such as ink toners) of plural colors.

2. Related Background Art

When color recording is performed by the additive color mixture based on image signals obtained through color separation, generally black lines and characters, in particular, are recorded by superposing recording materials of three colors, i.e., Y, M and C, or four colors, i.e., Y, M, C, and K.

However, the superposition of recording materials of those three or four colors raises the following problems:

(1) The resulting color by the superposition does not look perfectly black, (2) Difficulties in high-accurate superposition causes a color shear or offset, which also makes the resulting color not look black, and (3) In recording based on the pseudo-half-tone processing, the recording cannot be made by straying dots in a continuous linear line. Thus, an image cannot be represented with high resolution. Meanwhile, it has been previously proposed in U.S. patent application Ser. No. 378,488, now U.S. Pat. No. 5,029,227 a method of representing a monochromatic image by discriminating and separating portions of lines and characters in an image from other image portions of half tone, and recording only the former portions with high resolution, thereby allowing both gradation and resolution of the image to stand together in representation.

Although this method can solve the above problem (3), it has a shortcoming to require independent hardwares for different colors when applied to processing of a color image. Further, a method of discriminating a black portion from color signals and judging a region which coincides with a character portion extracted from the component of one color, e.g., the G component, as a black character region still accompanies the problems that the black portion is difficult to discriminate inexpensively with high accuracy, and that the judged black region is not always precisely coincident with the actual black region. In addition, the so-called black signal produced by masking or UCR cannot be employed for this type processing because that black signal is adapted to correct only black portions which can be represented by using C, M and Y, and thus has not a sufficient level for line portions of black characters, in particular. To solve the above problems, U.S. patent application Ser. No. 173,654, U.S. Pat. No. 4,958,219, U.S. patent application Ser. No. 327,098, now U.S. Pat. No. 5,047,844, U.S. patent application Ser. No. 367,673, and U.S. patent application Ser. No. 519,500 have been proposed, but there still remains room for improvement.

Furthermore, it is conventional in image processing apparatus that a color image is subjected to color separation into three colors, i.e., R, G and B, and C, M, Y and K (black) signal are then produced as record colors, followed by the pseudo-half-tone processing for each of the four colors. As a pseudo-half-tone processing technique, while there is known for many years a dither method which can be constituted inexpensively, a data storage type technique represented by an error dispersing method has become more popular in recent years which carries out error correction though re-quantization for enabling resolution and gradation to be reproduced in a substantially compatible manner.

In the above pseudo-half-tone processing technique of data storage type (i.e., the conditioned dither method), however, re-quantized dots are not directly determined from input data of one point. For the reason, when input image data obtained through color separation into four colors are processed independently, the re-quantized dots in four colors may locally overlap with each other. Accordingly, in the case that recording is made using the electrostatic process based on the re-quantized data, for example, toners of four colors locally overlap with each other to form a projection with the height of several 100 microns on the sheet surface of transfer paper, resulting in drawbacks of lowering a fixing property and degrading an image quality.

In the case of recording an image by an ink jet technique, for example, a large amount of ink is jetted into a local area. This results in similar drawbacks that an ink smear occurs on the rear side of recording paper and a longer period of time is required for drying.

In addition, when deposit positions of recording materials of different colors are not perfectly coincident with each other for each pixel by virtue of limitations in mechanical accuracy, a color shear is caused and color reproducibility is badly deteriorated.

SUMMARY OF THE INVENTION

The present invention has been accomplished in view the problems stated above, and has for its object to provide an image processing apparatus which can satisfactorily reproduce a color image, particularly, a black color line in the color image.

To achieve the above object, the present invention discloses an image processing apparatus comprising first judgment means for judging whether or not a pixel of interest belongs to a black line image portion, and outputting a first judgment signal indicating a judgment result, second judgment means for judging whether or not pixels in the vicinity of said pixel of interest belong to a black line image portion, and outputting a second judgment signal indicating a judgment result, and control means for controlling recording of said pixel of interest based on the first and second judgment signals outputted from said first and second judgment means.

Also, there is disclosed an image processing method comprising a first judgment step of judging whether or not a pixel of interest belongs to a black line image portion, a second judgment step of judging whether or not pixels in the vicinity of said pixel of interest belong to a black line image portion, and a control step of controlling recording of said pixel of interest based on judgment results in said first and second judgment steps.

Another object of the present invention is to provide an image processing apparatus which has a simplified circuit configuration.

To achieve that object, the present invention discloses an image processing apparatus comprising m-value coding means for coding a plurality of color component signals, each in n bits, one by one into any value ranging from 0 to m (where 2≦m<n), judgment means for judging whether or not an image represented by said plurality of color component signals belongs to a black line image portion, and control means for controlling, based on a judgment result by said judgment means, recording with a plurality of color component signals which have been coded by said m-value coding means Into any value ranging 0 to m.

Still another object of the present invention is to provide an image processing apparatus suitable for high-speed processing and real-time processing.

To achieve that object, the present invention discloses an image processing apparatus comprising means for binary-coding a plurality of color component signals color by color, means for removing minor color components from said color component signals, and means for generating record color signals by using both the color component signal left after-removing said minor color components and said color component signals before the binary-coding.

Yet another object of the present invention is to provide an image processing apparatus which has satisfactory color reproducibility.

To achieve that object, the present invention discloses an image processing apparatus comprising detecting means for detecting a black line image portion in an input color image, and generating means for generating record signals to record the black line image portion, detected by said detecting means, by superposing multiple dots including a black dot.

Also, there is disclosed an image processing method comprising the steps of detecting a black line image portion in an input color image, and generating record signals to record said black line image portion by superposing multiple dots including a black dot.

Other objects and modes of the present invention will be apparent from the following explanation with reference to the attached drawings and the description of claims.

BRIEF DESCRIPTION OF THE DRAWINGS

FIGS. 1A to 1C are views showing an entire configuration of a first embodiment of the present invention.

FIGS. 8A to 8C and FIGS. 9A to 9D are views for explaining a modification of the first embodiment of the present invention.

FIGS. 10, 11 and 12 are views for explaining a record apparatus (element).

FIGS. 19 and 20 are views showing an entire configuration of a third embodiment of the present invention, FIGS. 25, 26, 27 and 28 are views for explaining a modification of the third embodiment of the present invention.

DETAILED DESCRIPTION OF THE PREFERRED EMBODIMENTS

[First Embodiment]

Figure 1B:
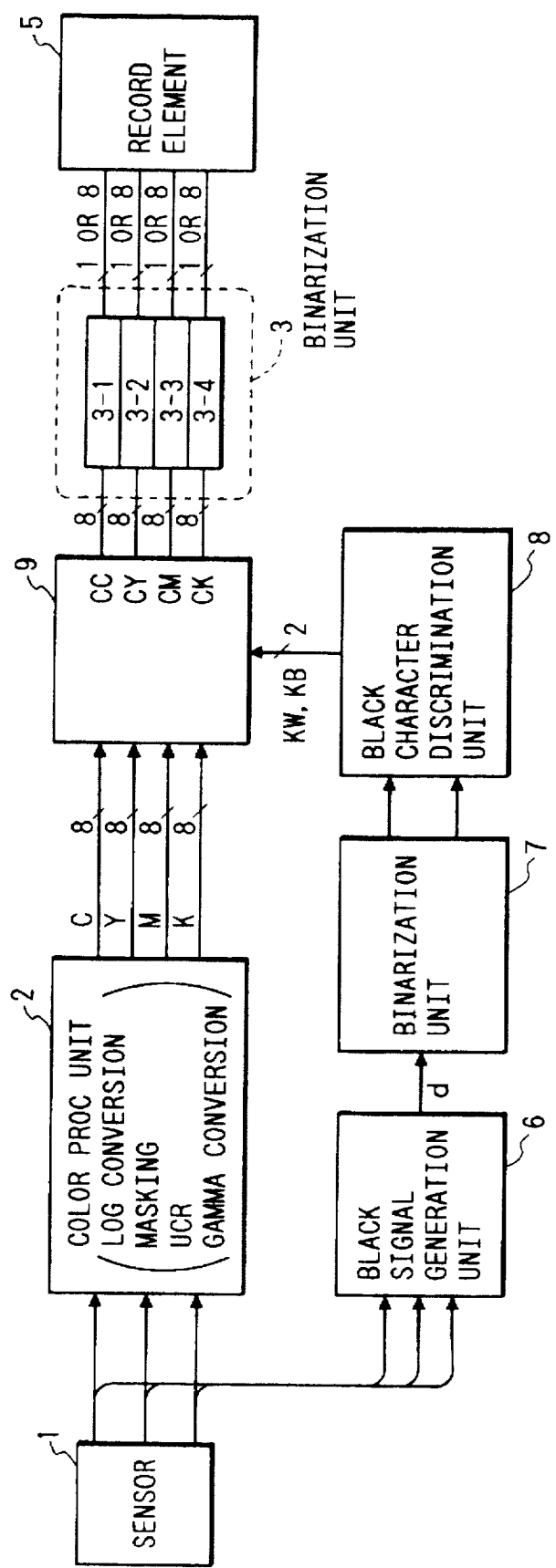

FIG. 1A is a block diagram showing an entire configuration of a first embodiment of the present invention. In the drawing, designated by reference numeral 1 is a color CCD line sensor which performs color separation substantially at the same point on an original document into signals in three colors R, G and B, and also quantizes each color signal using 8 bits. The R, G and B signals point-sequentially read by the sensor 1 are inputted to a color processing unit 2 for the so-called color signal processing such as log conversion, masking, UCR and gamma (γ) conversion, thereby obtaining 8-bit record signals in record colors of Y, M, C and K. These record signals are subjected to the so-called pseudo-half-tone processing, for example, an error dispersing method or a mean density storage method, in respective binarization units 3-1, 3-2, 3-3 and 3-4. On the other hand, the R, G and B signals resulted from color separation are also inputted to a black signal generation unit 6, which is a feature of the present invention, to produce a black signal d having 8 bits, i.e., 256 levels, and being suppressed in a color tint. The black signal d is binary-coded by a binarization unit 7 with high accuracy. A resulting binary signal is inputted to a black character discrimination unit 8 which discriminates and separates character/line image portions from half-tone image portions and screen image portions, followed by applying a signal indicative of the discrimination result to a record signal control unit 4. The control unit 4 controls, based on-the discrimination signal, the aforesaid binary signals in four colors which have been binary-coded independently of one another, thereby driving record element (apparatus) 5 to make a recording.

The first embodiment of the present invention will now be described in detail in the order of the black signal generation unit 6, the binarization unit 7, the discrimination unit 8, and the binary data control unit 4. It is to be noted that the color signal processing unit 2 and the binarization unit 3 can be constituted by totally adopting the well-known technology and, therefore, will not be explained here.

<Black Signal Generation Unit>

Figure 2A:
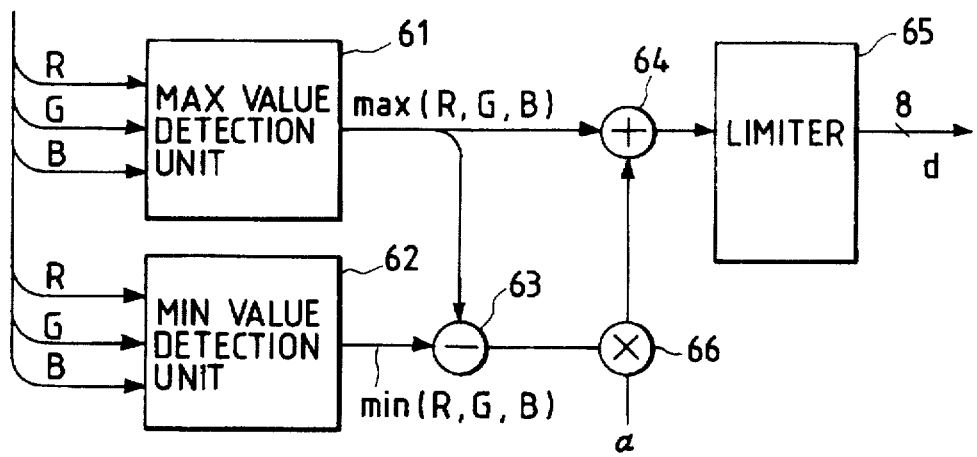
FIGS. 2A to 2D are views for explaining generation of a black signal.

FIG. 2A shows the black signal generation unit 6. In the drawing, a max value detection unit 61 and a min value detection unit 62 each compare levels of the RGB signals, each represented by 8 bits, with each other per pixel and respectively obtain a value having the highest level and a value having the lowest level as max(RGB) and min(RGB). An adder 63 calculates a difference between the obtained two signals, i.e., max(RGB)−min(RGB). The calculated result multiplied by a preset constant α in a multiplier 66, and the product is added to the max(RGB) in an adder 64.

The added result is limited to 255 by a limiter 65 when it exceeds the 8-bit width, for producing the black signal d.

Figure 2B:
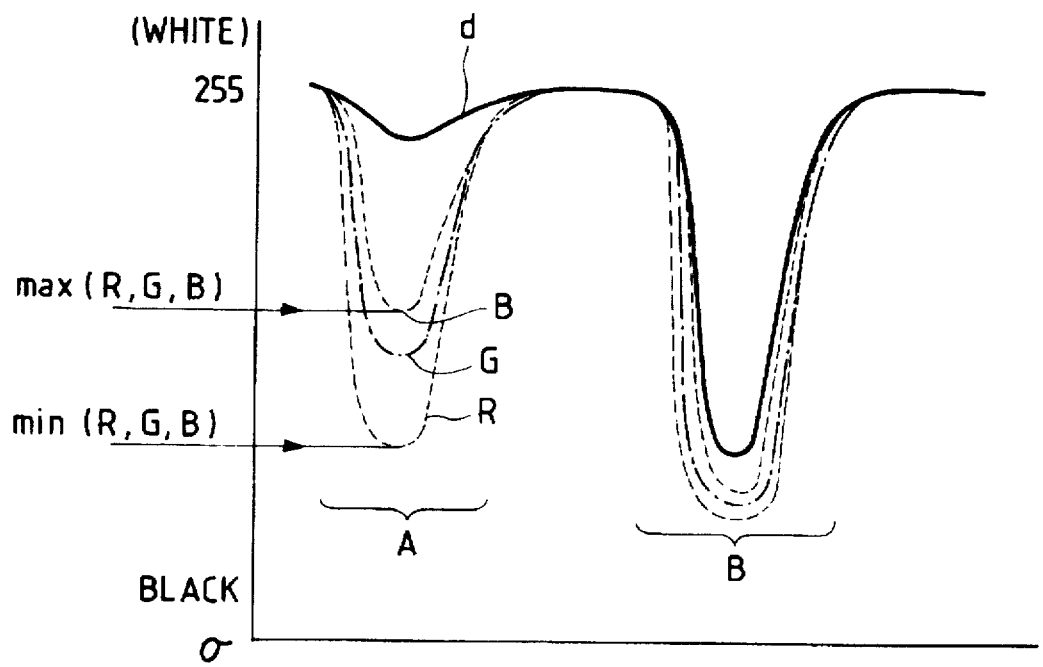

FIG. 2B shows an explanatory view for that processing. It is assumed in this embodiment that as the color signals R, G and B have larger values, the pixel color approaches white and becomes black when R=G=B=0 holds. In FIG. 2B, therefore, a region A represents a line with a color tint and a region B represents a black line.

The calculation executed in the black signal generation unit 6 is expressed by the following equation (1):

$$d = \max(RGB) + \alpha[\max(RGB) - \min(RGB)] \quad (1)$$

where max(RGB) is a gray component signal, max(RGB)−min(RGB) is a signal indicating a color tint, and α is a color suppression constant)

This processing has a physical meaning as follows. Assuming now that max(RGB)−min(RGB) indicates a color tint and max(RGB) indicates a gray component (brightness), it is possible, when max(RGB)−min(RGB) is large, i.e., for a pixel having a color tint, to perform conversion in a direction to increase brightness (white level) by multiplying the difference value by the constant α and adding the product to max(RGB). Accordingly, the Larger the value of the constant α, the closer the pixel having a color tint approaches a white level. Thus, α is called a color suppression constant of which value represents a degree of suppressing a color tint. Stated otherwise, by making a not-shown CPU change the value of α to be set by the multiplier 66, the degree of detection of a black component indicated by d can be varied. The value of α may be, for example, set by an operator from a not-shown console. Even in the case of α=1 shown in FIG. 2B, if max(RGB) is large and so is max(RGB)−min(RGB), the pixel of interest takes the maximum value of 255 representing a perfect white level by operation of the limiter 65 in FIG. 2A. Consequently, it is believed that changes in the produced signal d nearly imply changes in the black component.

Figure 3:
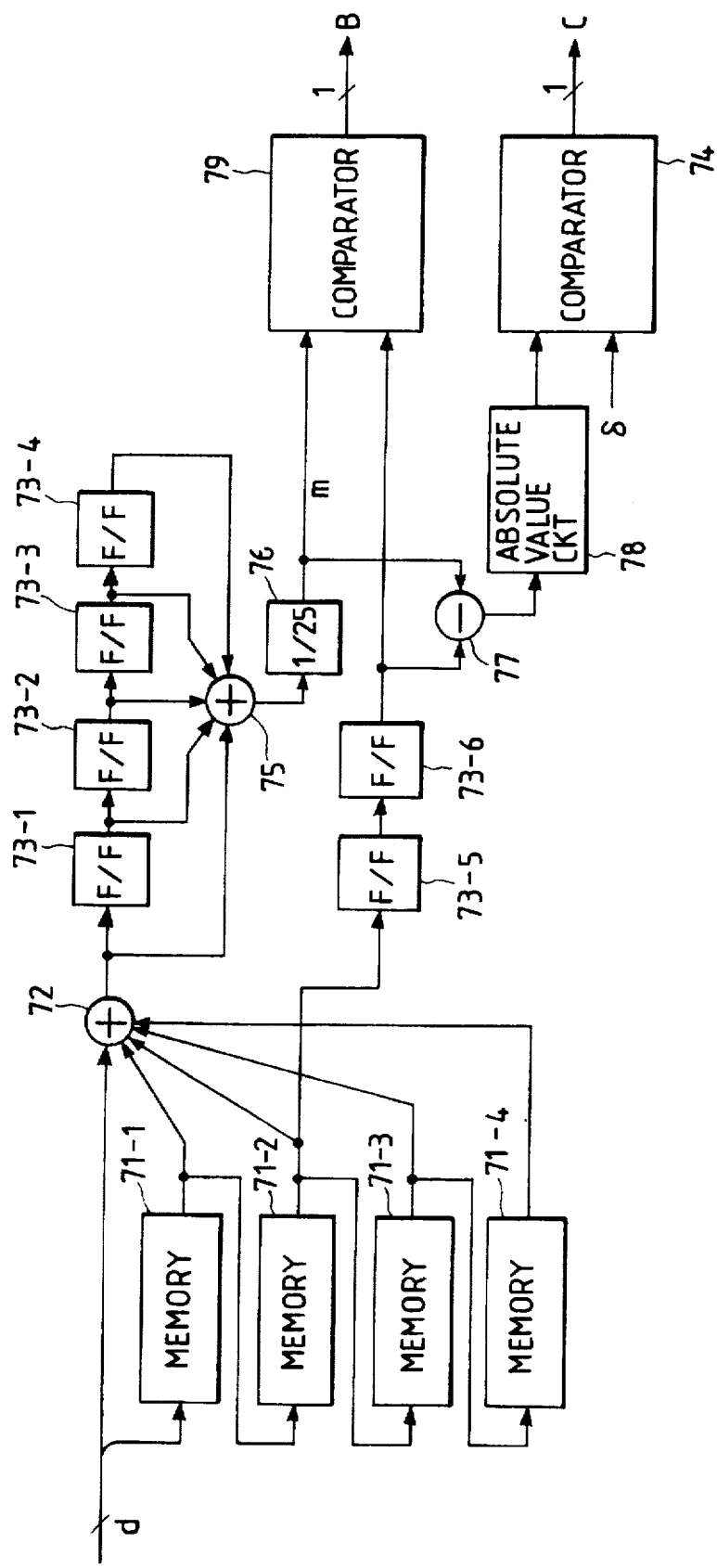
FIG. 3 is a view showing a binarization unit.

The black signal d is inputted to the binarization unit 7 shown in FIG. 3.

<Binarization Unit>

In FIG. 3, data of the black signal d are delayed and held by using memories 71 on a line by line basis, and the data of five pixels thus successively delayed are added in an adder 72. The added value for every five pixels is applied to flip-flops (F/F's) 73 to be successively delayed and held on a pixel by pixel basis, and the resulting five added values are further added in an adder 75. Assuming that the position of an output of an F/F 73-6 resulted from delaying an output of the memory 71-2, which is resulted from delaying the input data by two lines, by two pixels through F/F's 73-5 and 73-6 is a position of the pixel of interest, an output of the adder 75 is an integral value of 25 pixels surrounding the pixel of interest. Accordingly, a mean value m of the black signals in the vicinity of the pixel of interest is obtained by dividing the integral value in a divider 76.

A comparator 79 compares the data d about the position of the pixel of interest with a threshold given by the mean value m, thereby obtaining a more accurate binary signal B. Specifically, the comparator 79 produces an output in accordance with the following rules:

$$\begin{cases} \text{if } d < m, \text{ then } B = 1 \text{ (black)} \\ \text{if } d \geq m, \text{ then } B = 0 \text{ (white)} \end{cases}$$

Furthermore, the difference between both the average values m and d is determined by an adder 77 and converted into an absolute value by an absolute value circuit 78. Then, the absolute value is compared with a constant δ in a comparator 74 to obtain a binary signal C in accordance with the following rules:

$$\begin{cases} \text{if } |d - m| > \delta, \text{ then } C = 1 \\ \text{if } |d - m| \leq \delta, \text{ then } C = 0 \end{cases}$$

The above two signals have physical meanings that the former signal B is a signal resulted from high-accurately binarizing the black signal, whereas the latter signal C is a signal resulted from binarizing a level change amount at the pixel of interest. Specifically, in the case of B=1 and C=1, it can be judged that the density change at the pixel of interest is larger than the constant δ and shifted toward a black level. Thus, the probability that the pixel of interest is a part of character lines can be said to be high.

However, the pixel of interest may possibly belong to a half-tone image portion expressed by a screen. To eliminate the possibility of a screen, therefore, signals of 2 bits, i.e., signals B, C, are inputted to the black character discrimination unit 8 for discriminating a character image portion.

<Black Character Discrimination Unit>

Figure 4:
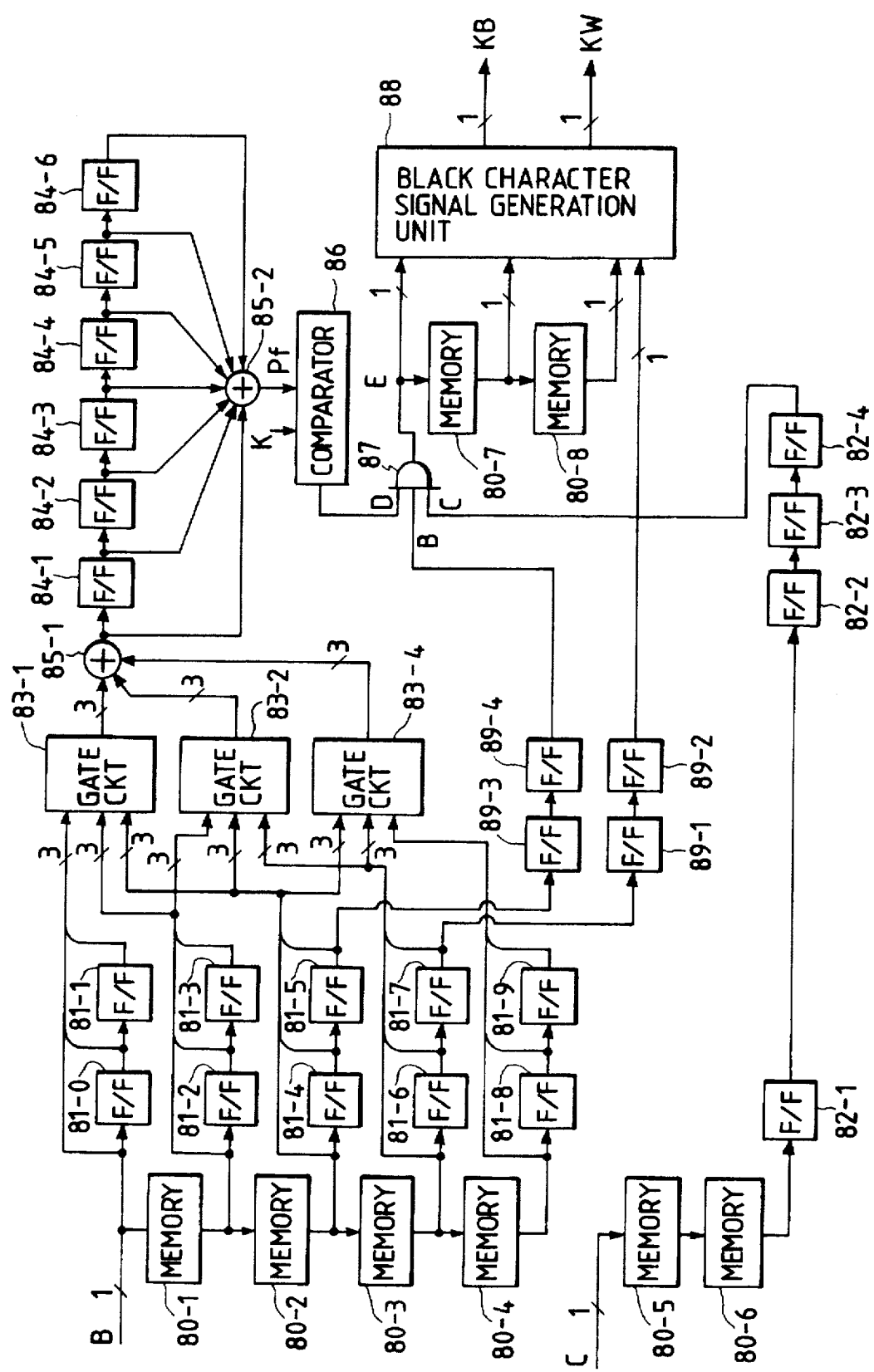
FIG. 4 is a view showing a black character discrimination unit.

FIG. 4 shows the black character discrimination unit. First, the binary signal B inputted thereto is successively delayed and held by using line memories 80-1, 80-2, 80-3, 80-4 on a line by line basis, and also successively delayed and held by flip-flops (F/F's) 81-1 to 81-9 on a pixel by pixel basis. Accordingly, assuming now that the position of the pixel of interest is an output position of the F/F 81-4, the binary data B of 8 pixels adjacent the pixel of interest are obtained at input terminals of the F/F's 81-2, 81-4, 81-6 and output terminals of the F/F's 81-2, 81-6, 81-3, 81-5, 81-7. Then, the adjacent nine pixel data including the pixel of interest are all inputted to a gate circuit 83-2.

Considering in a like manner, pixel data one line after the above pixel of interest, i.e., data of 9 pixels adjacent the output position of the F/F 81-2, are inputted to a gate circuit 83-1, and pixel data one line before the above pixel of interest, i.e., data of 9 pixels adjacent the output position of the F/F 81-6, are inputted to a gate circuit 83-4. In each gate circuit 83 (though described later in detail), depending on whether or not the binary level (0 or 1) of the central pixel is inverted from the binary levels of the adjacent eight pixels, i.e., whether or not the central pixel has a level of "0" or "1" isolatedly from the surrounding pixels, a value S ranging from 0 to 4 is assigned to each pixel. It can be said that the larger the value S, the higher the probability that the pixel of interest belongs to a screen image portion and, conversely, the value S of 0 means the higher probability that the pixel of interest belongs to a character or like line. This is because a character line is given by a set of one-dimensionally continuous dots. But, since whether or not the pixel of interest is a part of characters cannot be judged from one pixel, this judgment is made by two-dimensionally integrating the value S which is assigned to each pixel and represents a degree of isolation. In other words, multi-value data indicating a degree of isolation is used in the judgment. First, the data of 3 pixels in the direction of line are added in an adder 85-1, and the added result is successively delayed and held over six plurals by F/F's 84-1 to 84-6. Then, the respective delayed data are added, along with the current data, in an adder 85-2 to obtain an added value Pf of the data S for 3×7 pixels about the pixel of interest on the assumption that the pixel delayed from the input image data B by 2 lines and 4 pixels gives a position of the pixel of interest. This feature amount Pf implies two-dimensional spatial frequency. In short, the larger value Pf means that the more binary data B are inverted in their values between "0" and "1" in the vicinity of the pixel of interest, i.e., the spatial frequency is higher, and thus there are more two-dimensionally isolated dots. The value Pf is processed in accordance with the following rules:

$$\begin{cases} \text{If } Pf > K, C = 1 \text{ and } B = 1, & \text{then } E = 1 \\ \text{If otherwise,} & \text{then } E = 0 \end{cases}$$

More specifically, the value Pf is compared with a preset constant K (on the order of 4 to 5) in a comparator 86. A signal D indicating the compared result, the binary signal C at the position of the pixel of interest, i.e., the signal resulted from delaying the input image data by 2 lines through memories 80-5, 80-6 and by 4 pixels through F/F's 82-1 to 82-4, and the binary signal B at the same position are ANDed by an AND circuit 87. Letting an output value of the AND circuit 87 be E, E=1 indicates that the pixel of interest is a part off black characters.

The signal E and the signal B which is delayed from the position of the pixel of interest by 1 line and by 2 pixels through F/F's 89-1, 89-2 are inputted to a black character signal generation unit 88 to produce black character signals KB and KW as final outputs.

Figure 5:
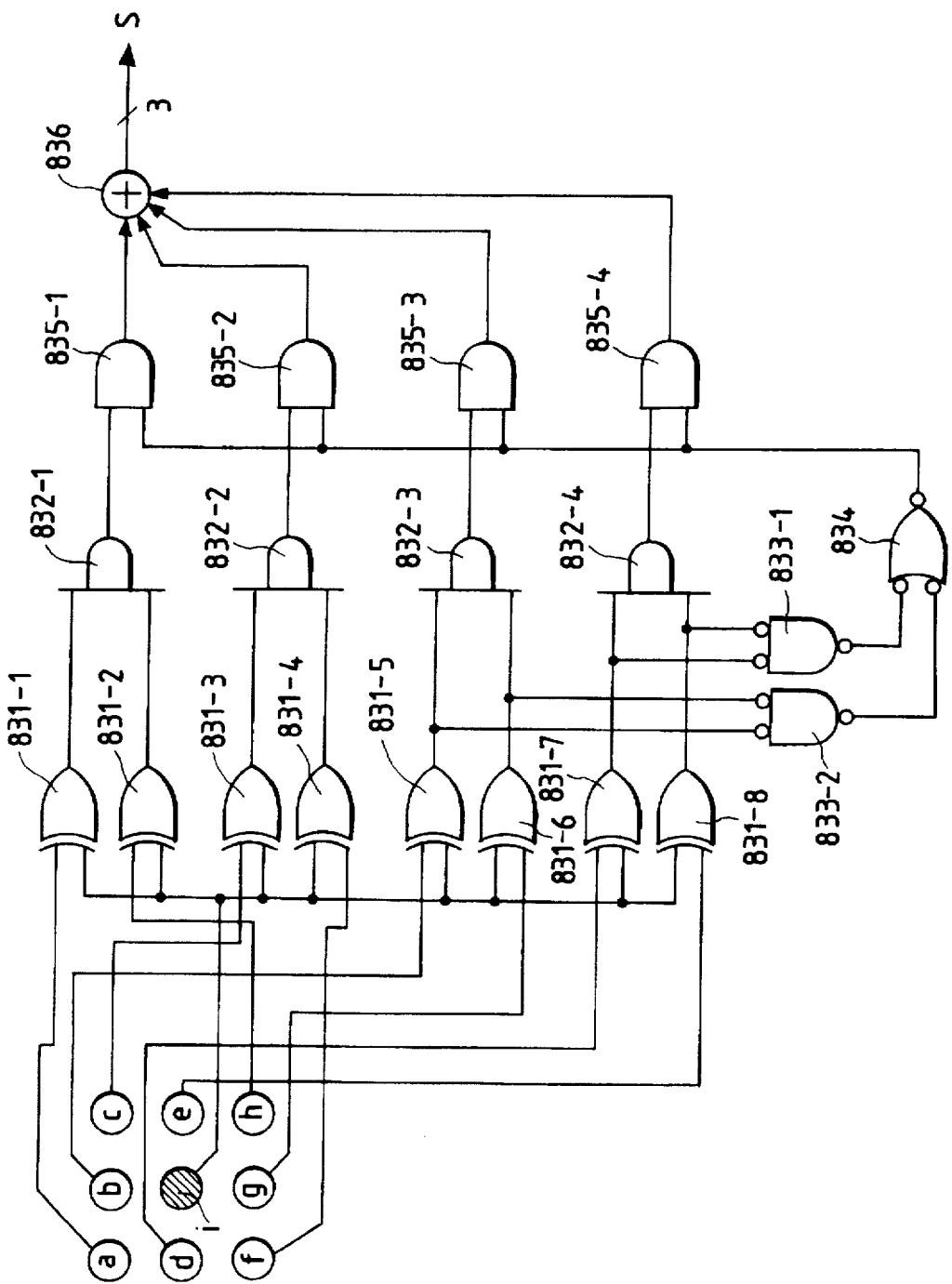
FIG. 5 is a view showing a circuit for judging a screen pixel.

The internal configuration of the gate circuit 83 will now be explained in more detail. FIG. 5 is a block diagram showing the gate circuit 83 in which a, b, c, d, e, f, g and h adjacent a central pixel i correspond to respective input and output signals B of the F/F's 81. EX-OR gates 831-1, 831-2 and an AND gate 832-1 serve to detect whether or not a level of the pixel i of interest is inverted in a direction passing the pixels a, i and h. Specifically, if outputs of the EX-OR gates are both "1", then the AND gate 832-1 produces an output of "1", meaning that the pixel i of interest is isolated in the direction of (aih). Like-wise, EX-OR gates 831-3, 831-4 and an AND gate 832-2 serve to detect isolation of the pixel i of interest in a direction of (cif), EX-OR gates 831-5, 831-6 and an AND gate 832-3 serve to detect isolation thereof in a direction of (big), and further EX-OR gates 831-7, 831-8 and an AND gate 832-4 serve to detect isolation thereof in a direction of (die). Then, AND gates 833-1, 833-2 and an OR gate 834 serve to detect the case that the pixel i of interest is at the same level "0" or "1" continuously in the direction of (big) or (die). If so, an output of the OR gate 834 becomes "0". This output signal is ANDed in AND gates 835-1 to 835-4 with each of outputs—of the AND gates 832-1 to 832-4, and the output results are added in an adder 836 to determine the value S indicating any one of 0 to 4.

The conditions provided by the AND gates 833 and the OR gate 834 have a physical meaning as follows. Since the continuity in the direction of (big) or (die) indicates one of segments of lines orthogonal to each other on a paper sheet (i.e., the original document or recording paper), the probability that the pixel of interest is a part of characters is high. In this case, therefore, S=0 is exclusively set to reduce the feature amount Pf.

In order to execute the above detection algorithm of segments of lines with higher accuracy, it is desirable that the setting of S=0 is limited to the case where the pixels b, i, g are all 0 (or 1) and a, d, f, c, e, h are all 1 (or 0), or where the pixels d, i, e are all 0 (or 1) and a, b, c, f, g, h are all 0 (or 1). Further, detecting a slant line and setting S=0 can be easily implemented in a like manner by adding circuits like the AND gates 833 and the OR gate 834 so as to detect the case where the pixels c, i, f are all 0 (or 1) and the others are all 1 (or 0), or where the pixels a, i, h are all 0 (or 1) and the others are all 0 (or 1).

It is also desirable for higher accurate discrimination of characters that an area over which data are integrated to obtain the value Pf is square and larger on the order of 7×7 than the illustrated embodiment. Note that the block size and the block shape are not limited to the above embodiment, and may be optionally set depending on detection accuracy or other factors.

Figure 6:
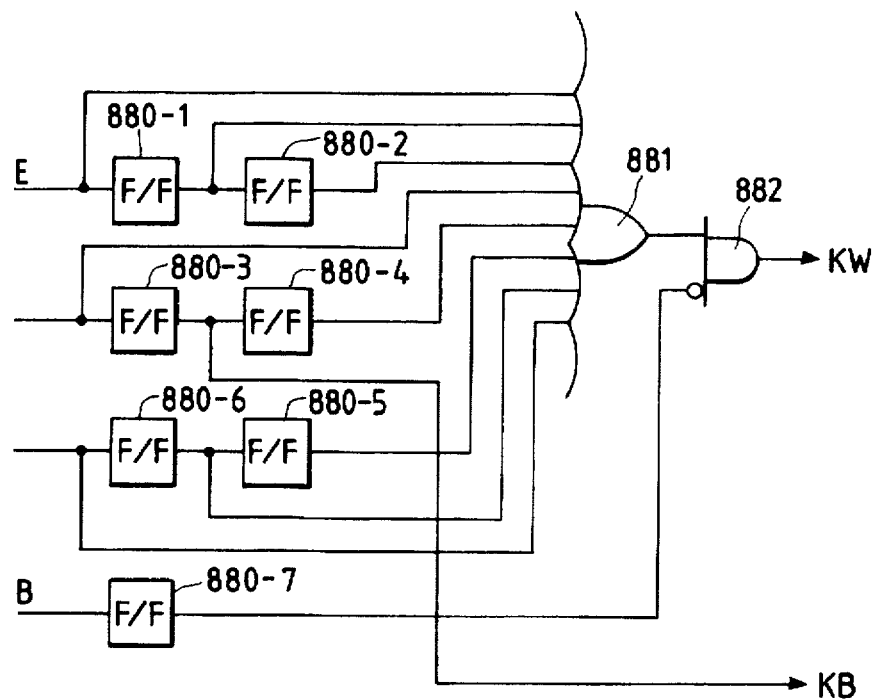
FIG. 6 is a view showing a black character signal generation unit.

Next, the internal configuration of the black character signal generation unit 88 will be described by referring to FIG. 6. This unit 88 is to produce a signal KB (1 bit) indicating that the pixel of interest is a part of black characters when KB=1 holds, and signal KW (1 bit), i.e., a black character adjacent pixel position signal, indicating that the pixel of interest is adjacent the black character image portion, but does not itself belong to the black character image portion (i.e., B=0) when KW=1 holds. More specifically, the unit 88 receives the 1-bit signals E and B, the signal E being delayed on a line by line basis through memories 80-7 and 80-8 (FIG. 5). The signals are further delayed on a pixel by pixel basis through F/F's 880-1 to 880-5 so that letting the position of the pixel of interest be an output position of the F/F 880-3, an OR gate 881 produces an output of "1" when any one of 8 pixels adjacent the pixel of interest exhibits E=1. Accordingly, when the signal B is delayed by an F/F 880-7 to be matched with the position of the pixel of interest, inverted in its level and inputted to an AND gate 882, the signal KW signal is obtained. The signals KB and KW are applied to the control signal control unit 4 as a feature of this embodiment for controlling the record signals. The control signal control unit 4 will be explained below in detail.

<Control Signal Control Unit 4>

Figure 7:
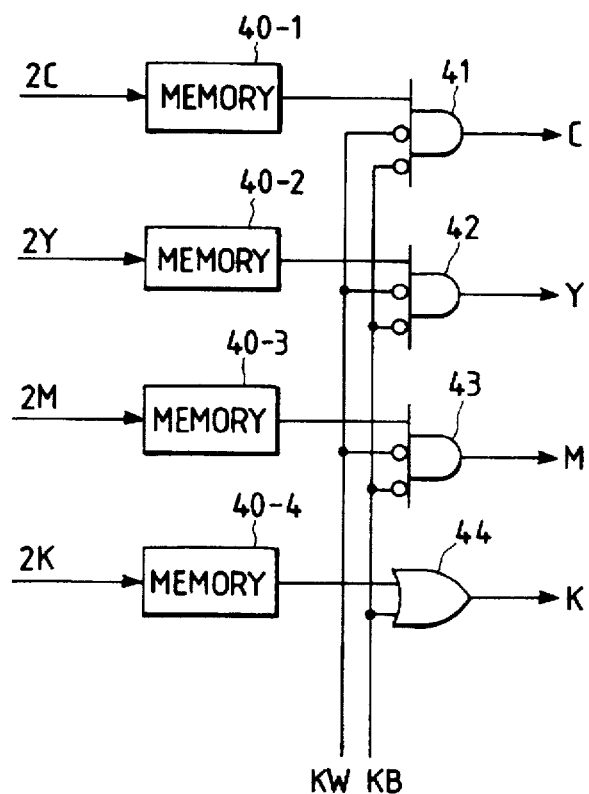
FIG. 7 is a view showing a record signal control unit.

Since the internal processing is delayed by 5 lines and several pixels with respect to the binary data because of the above generation of the black character signals KW, KB, the binary data are delayed to be matched with the position of the signals KB and KW. Memories 40-1 to 40-4 in FIG. 7 constitute respective delay circuits for that purpose, to thereby control binary record Signals 2C, 2Y, 2M and 2K as follows:

If KB=1, $$\begin{cases} \text{then } K = 1 \ldots \text{a dot is recorded} \\ \text{then } C, M, Y = 0 \ldots \text{dots are not recorded} \end{cases}$$

If KW=1, then C, M, Y=0

Thus, the black record signal records a dot based on the result of logical sum (OR) of the signal 2K and KB=1, and also stops and suppresses color recording to avoid color mixing the color record signal is present at the same position. For those pixels producing the signal KW=1, the color record signal is likewise suppressed to stop recording of a dot in the vicinity of a black character for clearer recording.

The relationships between KB, 2K, KW and dot recording are listed in Table 1 below.

TABLE 1

| (KB, 2K, KW) | Dot Recording |
| --- | --- |
| (1, 1, 1) | K = 1, C = M = Y = 0 |
| (1, 1, 0) | K = 1, C = M = Y = 0 |
| (1, 0, 1) | K = 1, C = M = Y = 0 |
| (1, 0, 0) | K = 1, C = M = Y = 0 |
| (0, 1, 1) | K = 1, C = M = Y = 0 |
| (0, 1, 0) | K = 1, C = M = Y = 0 |
| (0, 0, 1) | K = 1, C = M = Y = 0 |
| (0, 0, 0) | K = 0, For C, M and Y, usual binary data are recorded |

<Record Apparatus 5>

The configuration of the record apparatus 5 in FIG. 1A will be next described.

The present invention is applicable to various recording techniques such as ink jet recording, thermal transfer recording, electrostatic recording and electrophotographic recording. The following is an explanation relating to an example in which the present invention is applied to ink jet recording.

FIG. 10 is a perspective view of a head and associated elements of an ink jet recording apparatus which uses heat generating elements.

In the drawing, designated at 51 is a head unit having total of four nozzles 52. More specifically, the head unit 51 has a black ink discharge nozzle 52K, an yellow ink discharge nozzle 52Y, a magenta ink discharge nozzle 52M, and a cyan ink discharge nozzle 52C. 53 is an ink supply tube and 54 are main tanks which are provided four in number corresponding to the nozzles in one to one relation.

The structure of each nozzle 52 will now be explained by referring to a sectional view of FIG. 11. Designated by 55 is an upper plate, 56 a bottom plate, 57 a heat generating element, 58 an orifice, and 59 ink.

Upon application of voltage, the heat generating element 57 produces heat to create bubbles in the vicinity thereof, and upon the end of voltage application, the bubbles are contracted. In response to the formation and contraction of the air bubbles, the ink near the orifice 58 is discharged from the orifice 58.

The above-stated recording head is one of-so-called bubble jet type that the ink causes a state change such as film boiling under thermal energy for producing bubbles, and is jetted with the aid of the bubbles from the discharge port (nozzle) toward material on which recording is to be made, thereby recording characters, pictures and the like. With this type recording head, the size of the heat generating resistor (heater) provided in each nozzle is much smaller than a piezoelectric element used in conventional ink jet recording. This enables installment of the nozzles with higher density and image recording with higher quality, resulting in a benefit of high-speed and low-noise operation.

Moreover, a record apparatus may be used which has a multiplicity of heads for one kind of coloring material.

In FIG. 12, designated by 101 is a head unit in which a multiplicity of ink jet heads are arranged for one kind of coloring material in the sub-scan direction, the head unit being provided for each of black, yellow, cyan and magenta. 107 is an ink tank for the head unit, 109 is a signal line, and 104 is a carriage drive motor for moving a carriage 105 along a pair of rails 103 in cooperation with a conveyor belt 102, with the head unit being mounted to the carriage 105. 106 is recording paper, 120 is a platen, 111, 112 are rollers for feeding the recording paper, 113 a roll of the recording paper, and 114 is a guide roller. While the head unit 101 comprises a plurality of ink jet heads each utilizing the heat generating element shown in FIG. 11, it may of course employ ink jet heads using piezoelectric elements or electromechanical transducer means, for example.

<Another Embodiment (1) of Black Signal Generation Unit 6>

Figure 2C:
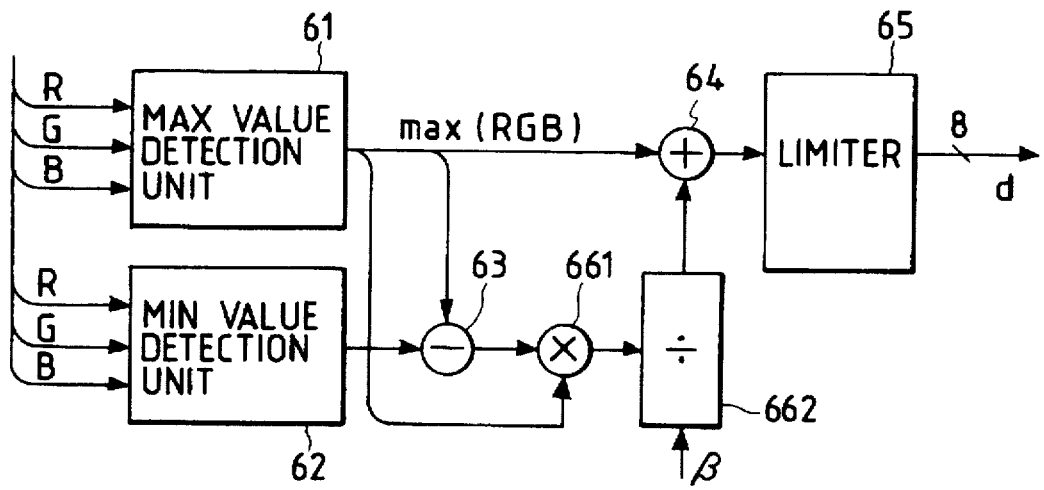

FIG. 2C shows another embodiment (1) of generation of the black signal. In the foregoing embodiment, the color tint suppression constant is given by the constant value $\alpha$ regardless of the gray component max(RGB). Generally, however, the larger the gray component, i.e., the brighter the pixel of interest, the more frequently the pixel of interest has a color tint. In view of that, as the pixel of interest is brighter, the degree of suppressing a color tint is made larger in this embodiment. By so setting, there can be produced the black signal d with higher contrast. An equation for calculating this type black signal d is below:

$$d = \max(RGB) + \frac{\max(RGB)}{\beta} \{\max(RGB) - \min(RGB)\}$$

The value of max(RGB)−min(RGB) obtained from the adder 63 is multiplied by the output max(RGB) of the max detection unit in a multiplier, and the multiplied result is divided by a constant $\beta$ in a divider 662. The value of $\beta$ is preferably about 128, for example. The divided result is added to max(RGB) in the adder 64, followed by clamping by the limiter 65 to 255.

<Another Embodiment (2) of Black Signal Generation Unit 6>

While a color tint is defined by the difference between max(RGB) and in(RGB) in the above embodiment (1) and suppressed through the adding operation, the color tint may be defined by a ratio of max(RGB) to min(RGB) and suppressed through a multiplying operation of max(RGB). This operation is expressed below:

$$d = \max(RGB) \times \frac{\max(RGB)}{\min(RGB) + \gamma}$$

Figure 2D:
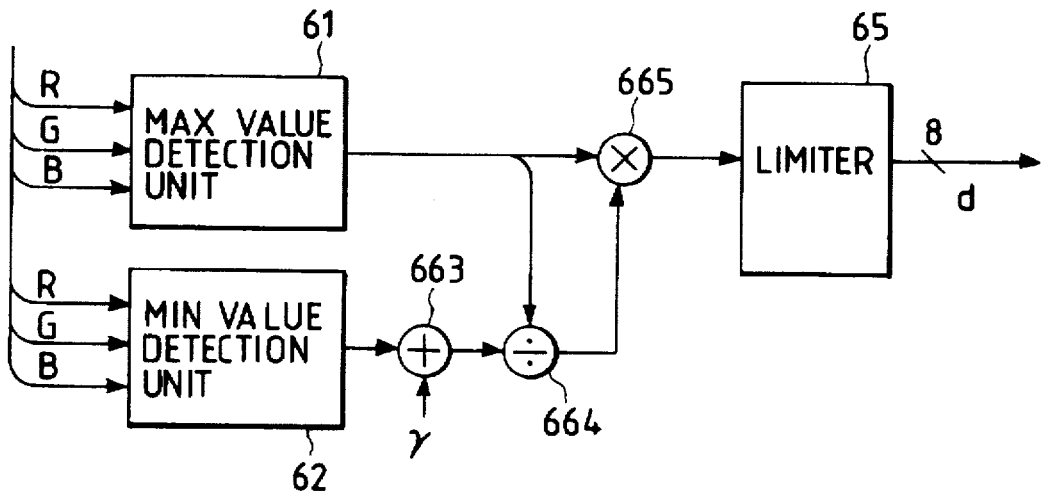

Here, the value of a constant $\gamma$ is preferably about 63. From the above equation, it will be found that the larger the gray component, i.e., the brighter the pixel of interest, the more effective the suppression of the color tint, and that the degree of suppression is alleviated depending on the constant $\gamma$ in some region, i.e., when max(RGB) and min(RGB) are both small. Therefore, even when the pixel of interest has a color tint in addition to the black component, the value of d will not be increased to enable generation of the black signal d with improved contrast. In this embodiment shown in FIG. 2D, the output of the min detection unit 62 is first added to the constant $\gamma$ in an adder 663, and the added result is divided by the output of the wax detection unit 61 in a divider 664. Then, the divided result is multiplied by max(RGB) in a multiplier 665.

Although the algorithm of producing multi-value data, suppressed in a color tint, from the R, G and B data has been explained above, it is a matter of course that the present invention is not limited to that algorithm, particularly, to the use of primary colors RGB, and the similar operating effect can be also obtained by using other color component signals such as record colors YMC, for example.

<Another Embodiment (1) of Record Data Control Unit 4>

While the foregoing embodiment has been disclosed as controlling the record data after binarization, another embodiment of controlling multi-value data before binarization will be-described by referring to FIGS. 1B and 8.

In FIG. 1B, the data converted by the color signal processing unit 2 into the four color signals of C, M, Y and K are controlled by the signals KW, KB of 2 bits outputted from the black character generation unit 8, and then binary-coded in the binarization unit 3, followed by recording. In the case of employing this embodiment, when the record element 5 is a laser beam printer in which the dot size can be modulated in multi-stages by the pulse width modulation or brightness modulation, or is a thermal record element such as a piezoelectric type ink jet printer or thermal transfer printer in which dots can be recorded in variable tones, the binarization unit 3 is not always required and the controlled multi-value data may be directly recorded.

Figure 8A:
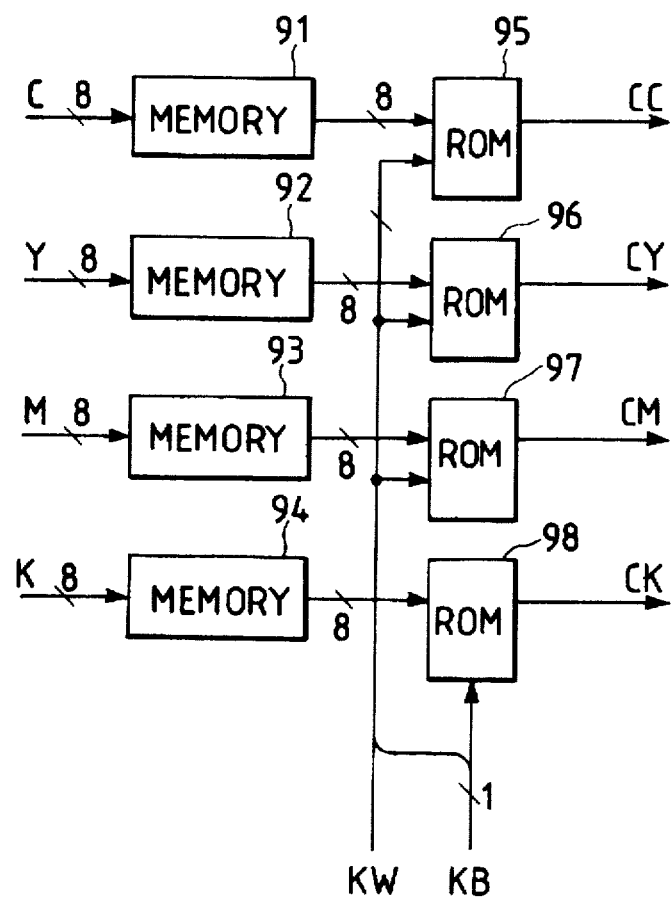

The internal configuration of a record signal control unit 9 according to this embodiment will now be explained in detail by referring to FIG. 8. In FIG. 8A, memories 91, 92, 93 and 94 constitute respective delay circuits for matching in position with the black character signals KW, KB like the foregoing embodiment. Then, the multi-value data in the respective colors are directly converted on a pixel by pixel basis depending on KB and KW through LUT (Look-Up Table) using ROM's 95, 96, 97 and 98.

Figure 8B:
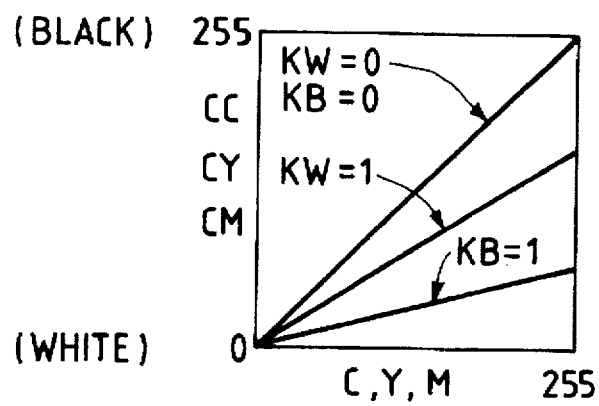
Figure 8C:
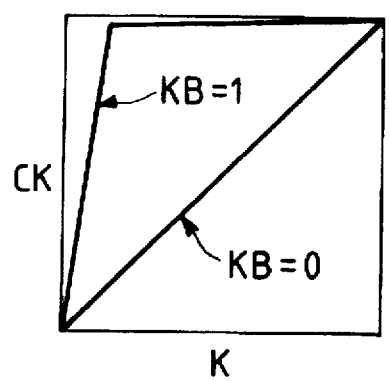

In the case of KB=1, a γ table is selected and used for the look-up which enhances the input data toward a black level as shown in FIG. 8C for the black signal K, and enhances the input data toward a white level conversely as shown in FIG. 8B for the color signals C, M and Y.

In the case of KW=1, the degree of enhancement for the color signals C, M and Y is slightly alleviated as compared with the case of KB=1. With this embodiment designed to control multi-value levels, since the surroundings of a black character having a background color can be controlled to a light color in a natural extent, particularly, in the case of KW=1, a record image can be obtained with higher quality.

It is needless to say that in the case of KB=1, CK=255 and CM, CC, CY=0 may be set regardless of the input data. In addition, the LUT may be performed using RAM's.

<Another Embodiment (2) of Record Data Control Unit 4>

Figure 1C:
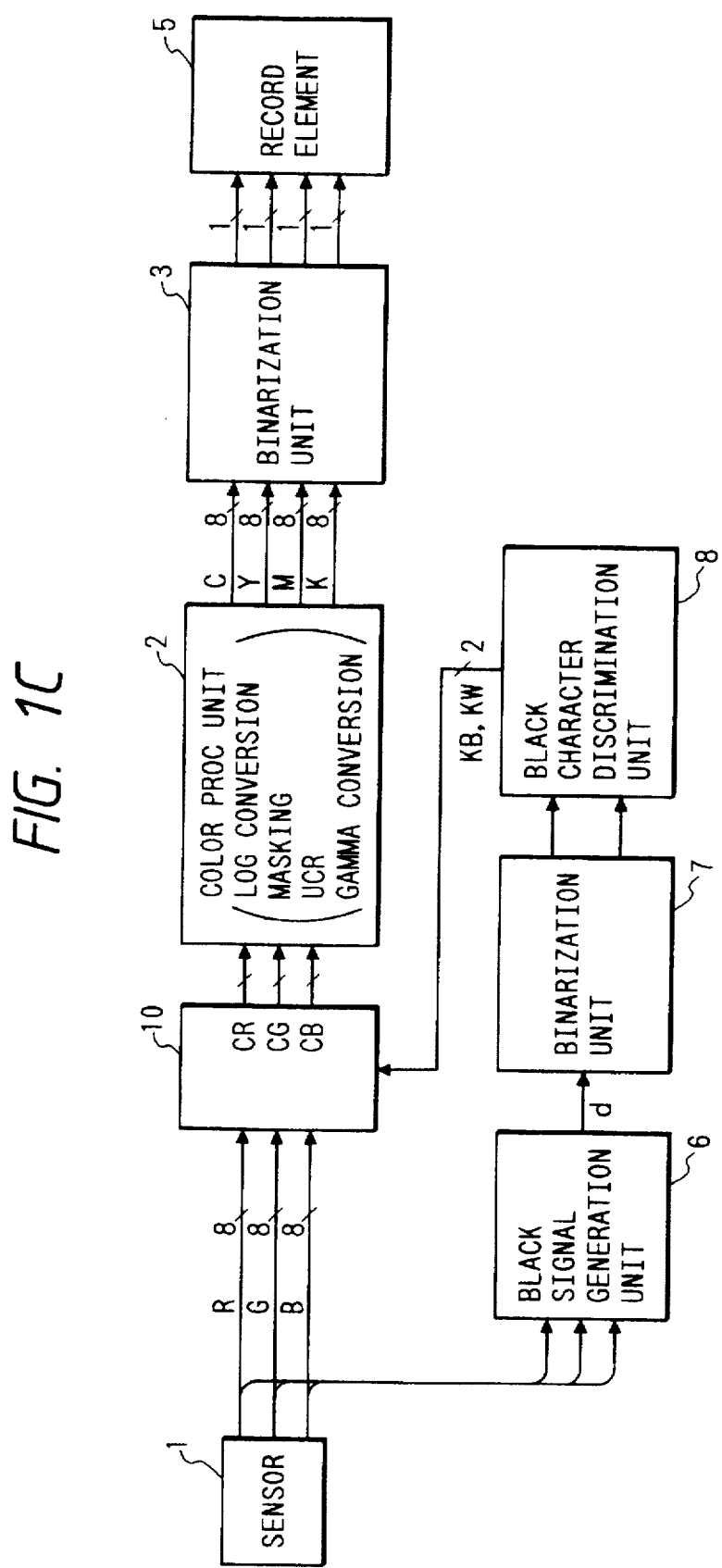

While the foregoing embodiments have been described as executing the black character processing after masking and UCR, the primary color signals, i.e., the R, G and B signals may be directly controlled, as shown in FIG. 1C, with the similar operating effect. A record data control unit 10 of this embodiment shown in FIG. 1C will now be explained in detail by referring to FIG. 9.

In FIG. 9A, delay memories 101, 102 and 103 used like the above embodiment are each a memory having the same capacity as the memories 91, 92, 93 and 94 in the embodiment shown in FIG. 8A. But, since a memory for one color can be dispensed with in this embodiment, the record data control unit 10 can be realized with simple construction. The input data of respective colors are converted through LUT conversion using ROM's 104, 105 and 106.

The respective color signals are enhanced toward a white level in the case of KW=1 as shown in FIG. 9C and, conversely, enhanced toward a black level in the case of KB=1 as shown in FIG. 9D. By subjecting the thus-converted data to usual masking and UCR, the signals Y, M, C and K are all enhanced toward a white level in the case of KW=1. On the contrary, in the case of KB=1, the signal K is enhanced toward a black level, while the signals C, M and Y are enhanced toward a white level. Note that conversion characteristics are not limited to linear ones in the above two embodiments, and use of non-linear characteristics makes it possible to control the input signal so as to become more black in the case of KB=1, and the color signals so as to become more white in the case of KW=1.

As described above, the foregoing embodiments have the following advantages:

(1) Black characters and lines in an image can be discriminated inexpensively with high accuracy, enabling characters to be recorded by the use of a single black color with high resolution, (2) Even if a color shear is caused during the recording, black characters can-be clearly recorded in black, and (3) Particularly, according to the foregoing embodiments, since the black color signal is extracted and the line and half-tone image portions are discriminated based on the extracted black signal, there is no need of newly generating a black signal for the purpose of discrimination, which can lead to simplification of the circuit configuration.

As printers to output the record signals generated in an above-stated manner, there can be used such printers capable of color recording as a color ink jet printer, a color thermal transfer printer, a color dot printer and a color laser beam printer.

In particular, the present invention represented by the foregoing embodiments is effective for use in a printer having a head of the type that droplets are discharged by utilization of film boiling under thermal energy, as disclosed in U.S. Pat. No. 4,723,129 and U.S. Pat. No. 4,740,796.

The aforementioned arithmetic circuits may be constituted using ROM's, RAM's or the like, or may be realized by a software executed in a computer to implement the above arithmetic operations.

Other than being applied from the CCD sensor, the image data may be applied from a host computer through an interface, or from an external memory.

According to the foregoing embodiments of the present invention, as explained above, black lines in a color image can be satisfactorily reproduced.

[Second Embodiment]

Figure 13:
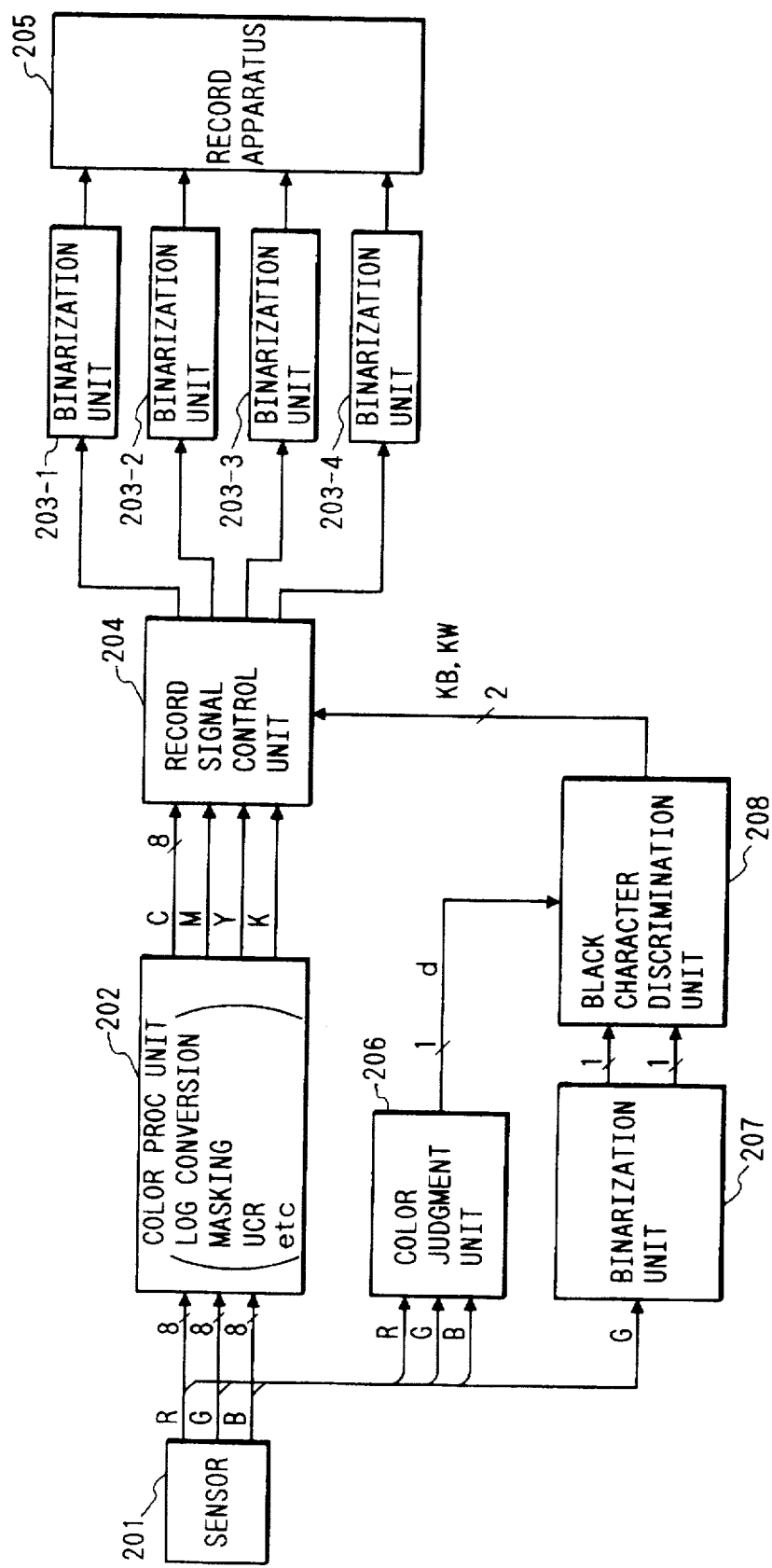
FIG. 13 is a view showing an entire configuration of a second embodiment of the present invention.

FIG. 13 shows a block diagram of a second embodiment of the present invention. In the drawing, designated by reference numeral 201 is a CCD line sensor for reading a color image, which reads substantially the same point on an original document through color separation into signals in three colors R, G and B, and also quantizes each color signal using 8 bits. Outputs of the sensor 201 are converted into 8-bit record signals in record colors of Y, M, C and K in a color signal processing unit 2 by the so-called color signal processing such as log conversion, masking, UCR and gamma (γ) conversion.

On the other hand, the R, G and B signals are inputted to a color judgment unit 206, which is a feature of the present invention, to produce a 1-bit judgment signal d indicating black or not on a pixel by pixel basis. Also, the G signal is binary-coded by a binarization unit 207, which is also a feature of the present invention, with high resolution. Based on a resulting binary signal and the black judgment signal d, a black character discrimination unit 208 produces a 1-bit signal KB indicating a black character image portion and a 1-bit signal KW indicating a pixel adjacent the black character image portion. In a record signal control unit 204, the black character signals KB, KW of 2 bits control the C, M, Y and K signals each having a 8-bit width and outputted from the color signal processing unit 202. More specifically, for a black character image portion, the signal K is enhanced, but the C, M and Y signals are suppressed. Therefore, as the result of subjecting those data to pseudo-half-tone processing in respective binarization units 203 independently, a clear image can be recorded by a record apparatus 205 while representing the black character and line image portions by the use of black dots only. Since the present invention is featured by the color judgment 206, the binarization unit 207, the black character discrimination unit 208 and the record signal control unit 204 as mentioned above, detailed description of other components are omitted and those units will be explained below one by one.

<Color Judgment Unit 206>

Figure 14:
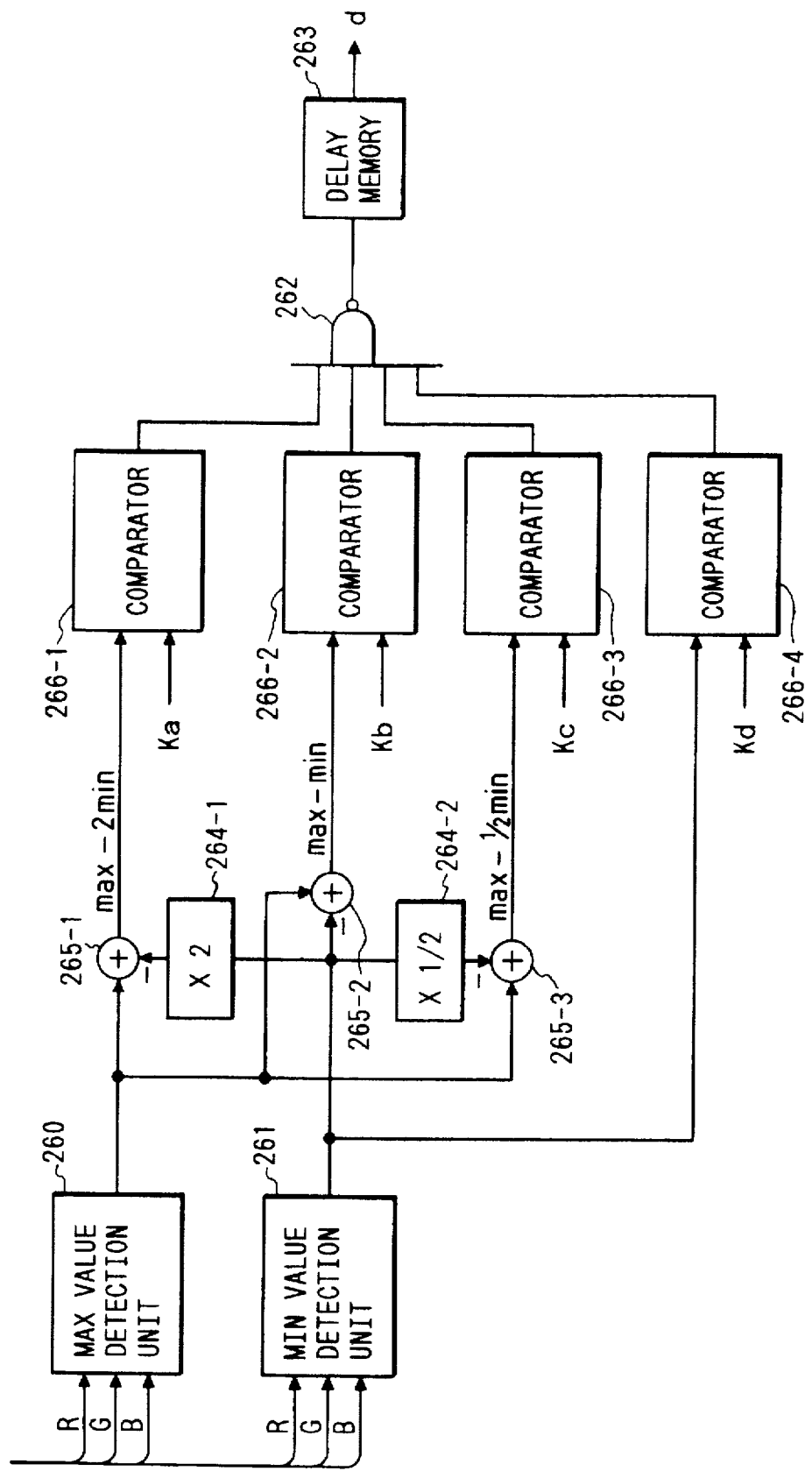
FIG. 14 is a view for explaining generation of a black signal.

FIG. 14 shows the color judgment unit 206 for making a judgment of black or not based on the R, G and B signals, and producing the black judgment signal d. In the drawing, a max detection unit 260 and a min detection unit 261 are blocks to determine a maximum value max(RGB) and a minimum value min(RGB) in the R, G and B signals inputted for each pixel, respectively. When the max and mini values are both 255 (or 0), the pixel of interest is white (or black). A judgment algorithm in this embodiment is expressed by:

$$\left. \begin{array}{l} max(RGB) - 2min(RGB) < Ka \\ max(RGB) - min(RGB) < Kb \\ max(RGB) - 1/2min(RGB) < Kc \\ max(RGB) < Kd \end{array} \right\} \quad (1)$$

If the above conditions (1) are all met, then the pixel of interest is judged as black (d=0). Thus, the results of comparison made in comparators 266-1, 266-2, 266-3 and 266-4 with respective constants Ka, Kb, Kc and Kd are inputted to a NAND gate 262 to obtain the judgment result d. Incidentally, a delay memory 263 is one necessary for timing adjustment with respect to the black character discrimination unit 208. In this embodiment, the values of the constants are assumed to be Ka=16, Kb=32, Kc=96 and Kd=160.

<Binarization Unit 207>

Figure 15:
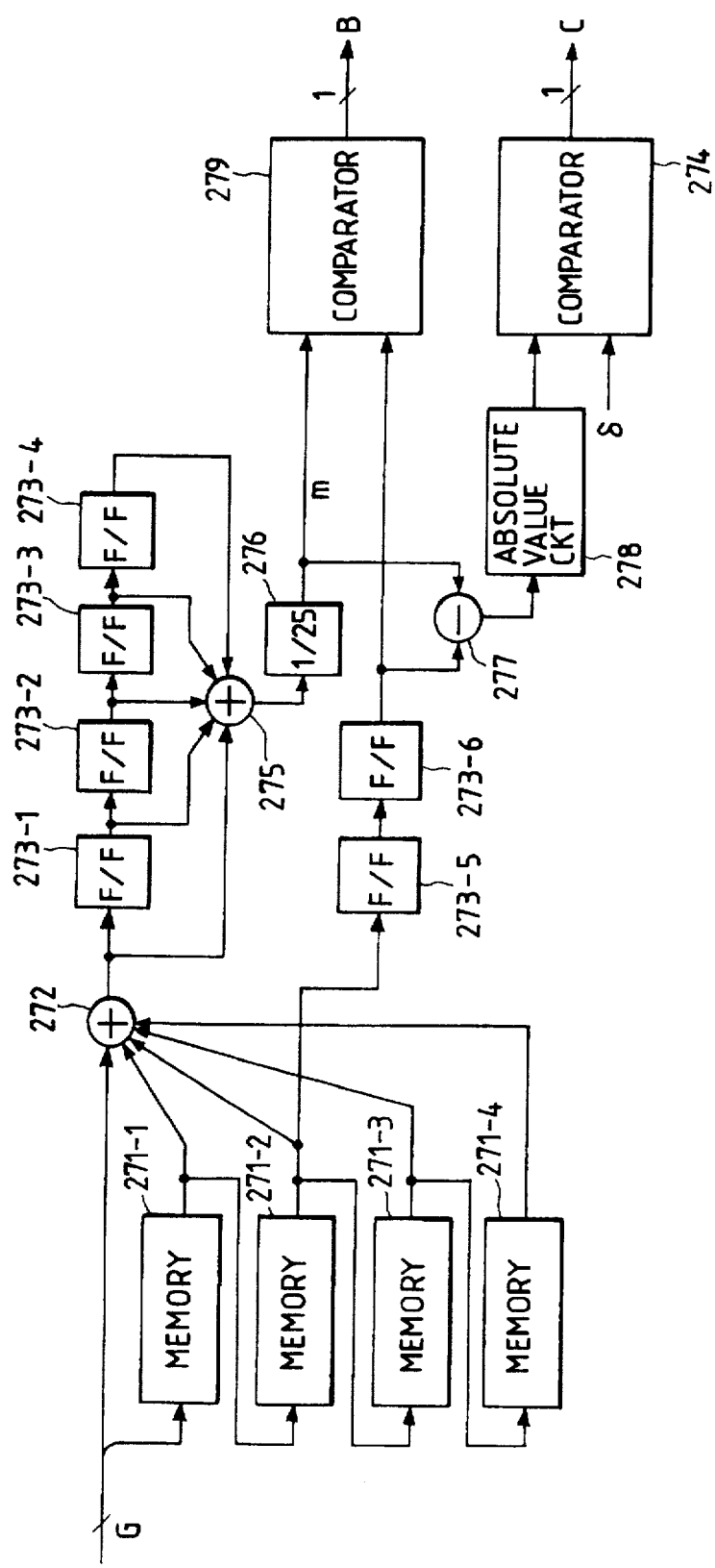
FIG. 15 is a view showing a binarization unit.

FIG. 15 is a block diagram of the binarization for judging black characters. In this embodiment, the G signal is binary-coded to detect black characters by using the G signal alone among the three R, G and B signals. A threshold for binarization is assumed to be a mean value obtained by simply adding data in an area of 5×5 adjacent the pixel of interest, and the difference between the binary-coded result B and the mean value is compared with a constant δ as a threshold, thereby producing a signal C. The reason of using the G signal here is in that of the three R, G and B signals, the G signal is closest to an ND image.

First, the input G data are delayed and held by using memories 271-1, 271-2, 271-3 and 271-4 on a line by line basis, and the data of five pixels thus successively delayed are added in an adder 272. The added value for every 5 pixels is applied to flip-flops (F/F's) 73 to be successively delayed and held on a pine by pixel basis, and the resulting five added values are further added in an adder 275. An output of the adder 275 is an integral value of 25 pixels adjacent the pixel of interest on assumption that the data resulted from delaying the input data by 2 lines through memories 271-1, 271-2 and then delaying the delayed data by 2 pixels through F/F's 273-5, 275-6 is a position of the pixel of interest. Then, the result m obtained by dividing the integral value by 25 is used as a threshold for comparison with the data of the pixel of interest in a comparator 279, to thereby provide a binary data B. Thus:

$$\left\{ \begin{array}{l} \text{If } G < m, \text{ then } B = 1 \text{ (black)} \\ \text{If } G \geq m, \text{ then } B = 0 \text{ (white)} \end{array} \right.$$

On the other hand, both the data are subtracted from each other in an adder 277 and converted into an absolute value by an absolute value circuit 278. Then, the absolute value is compared with the constant δ in a comparator 274 to obtain a 1-bit signal C indicating a degree of change in the image density. Thus:

If |G−m| > δ, then C=1

If |G−m| ≤ δ, then C=0

In this embodiment, the constant δ is set to be about 20. There will now be explained in detail the black character discrimination unit 208 based on the black judgment signal d and the binary signals B and C. Note that while the G signal is used in this embodiment, the similar result can be also obtained by using either one of the remaining R, B signals.

<Black Character Discrimination Unit 208>

Figure 16:
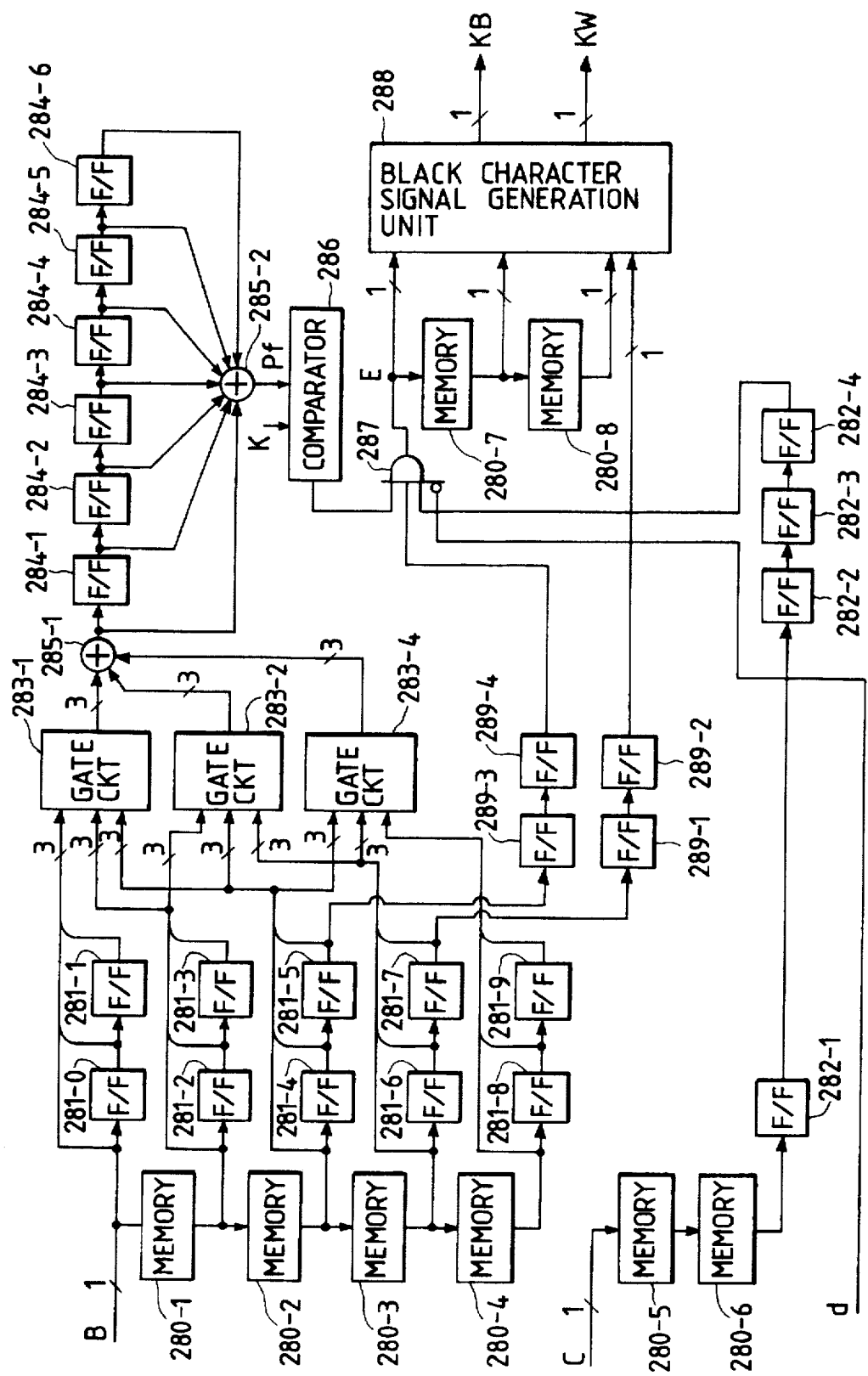
FIG. 16 is a view showing a black character discrimination unit.

FIG. 16 shows a circuit example of the black character discrimination unit 208. The binary data binary-coded through comparison with the mean value are successively delayed and held by using line memories 280-1, 280-2, 280-3, and 280-4 on a line by line basis, and also successively delayed and held by F/F's 281-2 to 281-9 on a pixel by pixel basis. A gate circuit 283-1 receives the input data and outputs of F/F's 281-0, 281-1, an output of the memory 280-1 and F/F's 281-2, 281-3, as well as an output of the memory 280-2 and F/F's 281-4, 281-5, that is, binary data of (3×3=) 9 pixels about the output position of the F/F 281-2. Then, the gate circuit 283-1 assigns a value S ranging from 0 to 4, which indicates a degree of dot isolation, to the central pixel, i.e., the output position of the F/F 281-2, based on the surrounding data.

Gate circuits (described later) 283-2, 283-4 are, like the above gate circuit 283-1, to assign the value S ranging from 0 to 4 to the output positions of the F/F's 281-4 and 281-6, respectively. The values S of 3 pixels in the direction of line are added in an adder 285-1, and the added value is successively delayed and held over six pixels by F/F's 284-1 to 284-6 while being shifted on a pixel by pixel basis. Then, the respective added values are integrated by an adder 285-2 to obtain a feature amount Pf which is an integral value of S for (3×7=) 21 pixels adjacent the pixel of interest on the assumption that the output position of an F/F 289-4 delayed from the input B data by 2 lines through the memories 280-1, 280-2 and then 4 pixels through F/F's 281-4, 281-5, 289-3, 289-4 gives a position of the pixel of interest. It can be said that this feature amount Pf nearly indicates the nature of a screen image.

Accordingly, the judgment of black characters is made based on the following conditions:

$$Pf < K,$$
$$B = 1 \text{ (recording dot)}$$
$$C = 1$$
$$d = 0 \text{ (black)}$$
(2)

More specifically the pixel of interest is judged as a part of black characters when meeting the above four conditions: the value Pf is smaller than a preset constant K, the binary signal is at "1" which means recording of a dot, the binary signal C is also at "1" (C=1) meaning that the image itself has a change in density, and the black judgment signal d is at "0" (d=0) meaning that the result of color judgment is black. In FIG. 16, a comparator 286 compares the constant K and the feature amount Pf. Then, the binary signal C is synchronized with the position of the pixel of interest by being delayed through line memories 280-5, 280-6 and F/F's 282-1, 282-2, 982-3 and 282-4, and inputted to an AND gate 287 along with the outputs of the comparator 286 and the F/F 289-4, thereby producing the result of black character judgment.

Details of the arithmetic unit (gate circuit) 283 for S indicating a degree of isolation is similar to FIG. 5 and thus will not be explained here. Respective positions of 9 pixels inputted to the gate circuit 283 are indicated as a to h in FIG. 5 with the pixel of interest (the pixel to be assigned with S) indicated as i. Basically, the value of S depends on the judgment as to whether or not the level of i is inverted in four directions about i. Specifically, when the level of i is inverted in all the four directions (i.e., i=1 (0) and all a to h=0 (1)), S=4 is assigned. When inverted in the three directions, S=3 is assigned. Likewise, When inverted in the n directions, S=n is assigned.

An output E of the AND gate 287 obtained in FIG. 16 is inputted to the black character signal generation unit 288 along with data resulted from delaying the output E by line memories 280-7, 280-8 on a line by line basis, thereby producing final outputs KB, KW. The configuration of the black character signal generation unit 288 is similar to that shown in FIG. 6.

From the foregoing process, there can be obtained the signal KB indicating a black character image portion and the adjacent position signal KW. The record signal control unit 204 for controlling the record signal based on the signals KB, KW of 2 bits will be next explained in detail.

<Record Signal Control Unit 204>

The configuration of the record signal control unit 204 is similar to that shown in FIG. 8. In FIG. 8, the memories 91, 92, 93 and 94 are delay memories for matching in position between the C, M, Y and K signals and the black character signals KW, Kb, and the synchronized data are converted using the ROM's 95, 96, 97 and 98. In the drawing, the RON 98 is one for controlling the black K signal to provide an enhancement toward a black level (255) in the case of KB=1, as shown.

On the other hand, the ROM's 95, 96, 97 are ones for converting the C, Y and M signals depending on the signals KB, KW of 2 bits such that the record data are suppressed as given by CC=½C, for example, toward a white level (0) in the case of KW=1, and further suppressed as given by CC=¼C in the case of KB=1. As a special case, it is also possible to set CK=255 for the K signal regardless of the input data and set CC=CM=CY=0 for the C, Y and M signals in the case of KB=1 or KW=1, thereby recording black characters by a single color in black and the surroundings at a higher level in white. Furthermore, in the case of KB=1, CK may be produced by enhancing the C or M signal, for example, rather than being produced by enhancing the K signal.

The reason why the respective signals are controlled by using not only the result of black character discrimination for the pixel of interest, but also the discrimination result for those ones surrounding the pixel of interest as stated above, is in that if an error occurs in the judgment for the pixel of interest, the resulting image quality could be prevented from degrading due to the erroneous judgment.

<Record Apparatus 205>

The construction of the record apparatus 205 in FIG. 13 is similar to that shown in FIGS. 10 to 12.

This embodiment of the invention is applicable to various recording techniques such as ink jet recording, thermal transfer recording, electrostatic recording and electrophotographic recording.

<Modification (1) of Second Embodiment>

Figure 17:
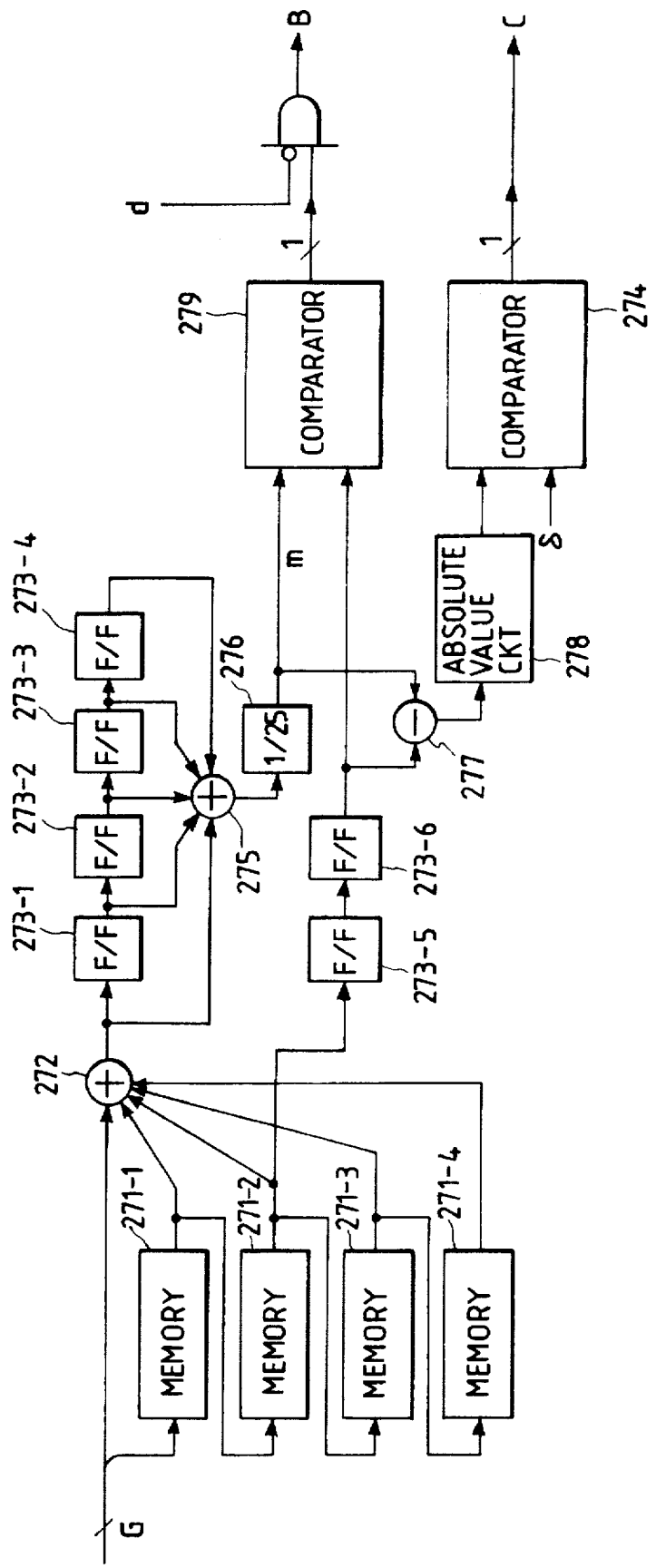
FIGS. 17 and 18 are views for explaining a modification of the second embodiment of the present invention.

While in the above second embodiment the black character signal is generated by using the black judgment signal d as the result of character judgment in FIG. 16, a similar result can be also obtained by taking the logical product (AND) of the black judgment signal d and the binary-coded result, and processing a resultant black binary data B with the black character judgment algorithm like the above one, to thereby generate the black character signal, as shown in FIG. 17. In this embodiment, the black character judgment unit 208 is substantially the same as the unit 8 shown in FIG. 4 except-that the black judgment result d is not applied to the AND gate 87 in FIG. 16. This embodiment has the advantage that since the black judgment result d is used in the binarization unit, the delay memory 263 in FIG. 14 can be cut down by about 2 lines as compared with the above second embodiment.

<Modification (2) of Second Embodiment>

Figure 18:
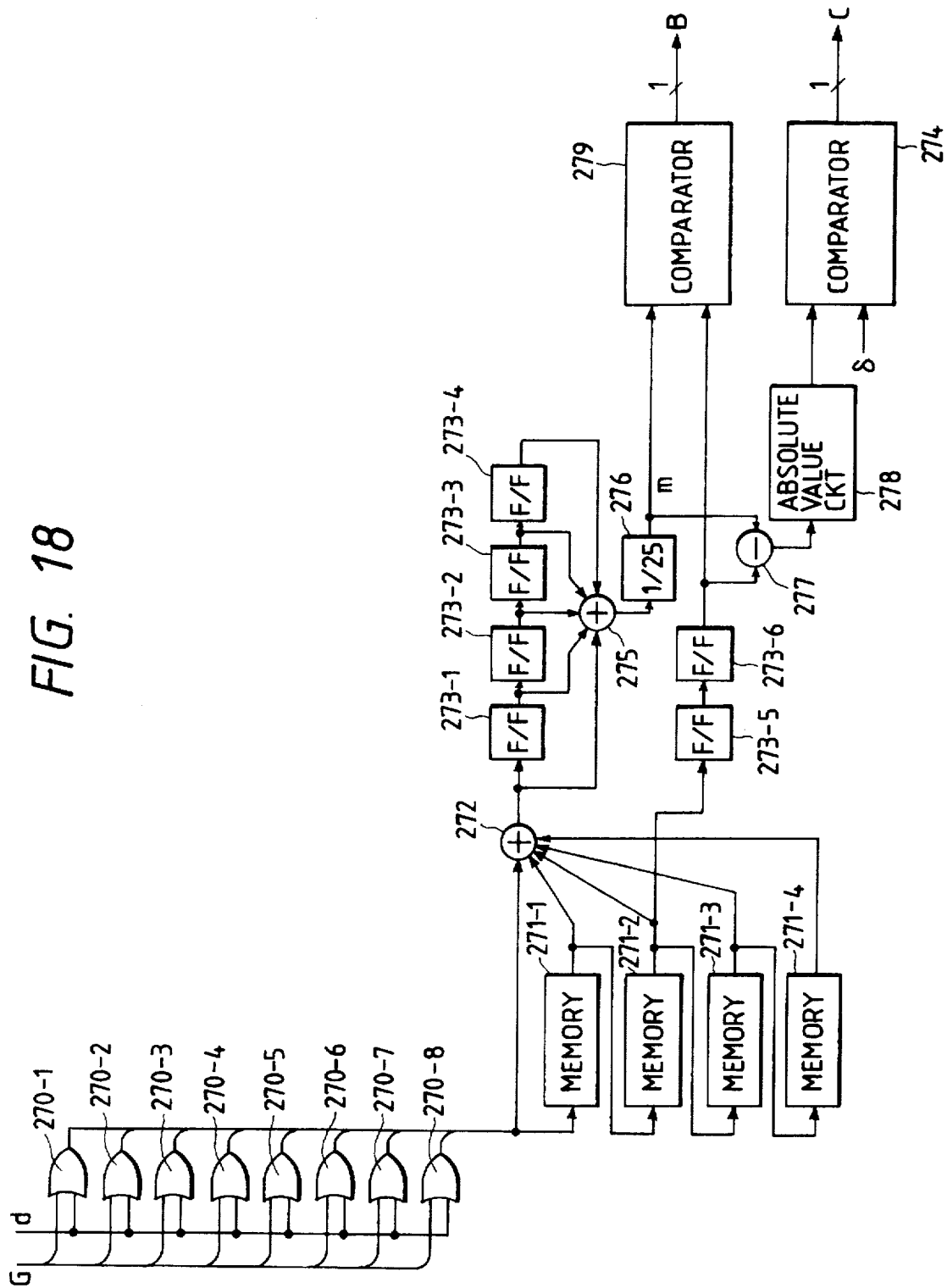

FIG. 18 shows another modification in which the black judgment result d is reflected on the G data inputted to the binarization unit. The black judgment result d and the G data are inputted to OR gates 270-1 to 270-8 on a bit by bit basis so that, only when the black judgment result d is "0", i.e., only in the case of a black pixel, the G data are inputted to the binarization unit, followed by execution of similar processing to the above. When the black judgment result d is "1", i.e., in the case of a colored pixel, all the bits of outputs from the OR gates 270 become "1". In other words, all the outputs represent the data 255 (white), with the result that the G signal suppressed in a color tint can be generated.

Specifically, since colored images exclusively exhibit the data 255, the difference between the mean value and the pixel data of interest becomes zero in those image areas, and the output of the comparator 274 is always "0". Eventually, the similar processing to the above embodiments can be performed by using the black character judgment unit shown in FIG. 4. This modification (2) of the second embodiment has the advantage that since the color judgment result d is not required to be delayed, the delay memory 263 in FIG. 14 can be omitted.

As described above, the present invention represented by the second embodiment comprises means for judging a specific color from a plurality of color component signals, means for extracting a line image portion from at least one color signal among the plurality of color component signals, means for discriminating the line image portion of the specific color based on an output of the extraction means and the judgment result of the judgment means, and means for controlling record color signals for a pixel of interest depending on discrimination results of the pixel of interest and surrounding pixels from the discrimination means, thereby providing advantages below:

(1) Black characters and lines in a color image can be discriminated inexpensively with high accuracy, enabling characters to be recorded by the use of a single black color with high resolution.

(2) Even if a color shear is caused during the recording, black characters can be clearly recorded in black, and (3) Particularly, according to this embodiment, since the record color signals for the pixel of interest are controlled depending on the discrimination results of the pixel of interest and the surrounding pixels in relation to the line image portion, higher-accurate control can be achieved as compared with the case of making control based on the pixel of interest alone.

As printers to output the record signals generated in an above-stated manner, there can be used such printers capable of color recording as a color ink jet printer, a color thermal transfer printer, a color dot printer and a color laser beam printer.

In particular, the present invention represented by the second embodiment is also effective for use in a printer having a head of the type that droplets are discharged by utilization of film boiling under thermal energy, as disclosed in, U.S. Pat. No. 4,723,129 and U.S. Pat. No. 4,740,796.

The aforementioned arithmetic circuits may be constituted using ROM's, RAM's or the like, or may be realized by a software executed in a computer to implement the above arithmetic operations.

Other than being applied from the CCD sensor, the image data may be applied from a host computer through an interface, or from an external storage unit.

The specific color is not limited to black and may be blue or red.

How to obtain the discrimination result of the surrounding pixels is not limited to the illustrated embodiment, and the discrimination result may be derived from information of 5×5 or 7×7 matrix, for example.

In addition, other than operating the logical sum (OR), the signal KW may be generated by, for example, counting the number of those pixels which are judged as belonging to black characters from the discrimination results, and setting some threshold as a slice level.

According to the second embodiment of the present invention, as explained above, black lines in a color image can be satisfactorily reproduced.

[Third Embodiment]

FIG. 19 shows an entire block diagram of a third embodiment of the present invention. In the drawing, designated by reference numeral 301 is an image input unit comprising a CCD line sensor for R, G and B. Analog image signals subjected to color separation into r, g and b on pixel by pixel basis are quantized by an A/D conversion unit 302 into digital image signals R, G and B each having an 8-bit (0 to 255) width. The quantized data are converted through log conversion made by a data conversion unit 303, here not explained in detail, into image signals of Y, M and C as record colors. The data conversion unit 303 generally carries out well-known cats conversion such as correction of unevenness occurred in the image reading unit including the sensor 301, log conversion, so-called masking processing dependent on spectroscopic characteristics of the sensor 301 and recording material, enlargement and reduction of size, etc.

Error correction units 304, re-quantization units 306, and memories 307, 305, all designed to make processing for each color of Y, M and C, jointly constitute the so-called pseudo-half-tone processing unit for re-quantizing Y, M and C record signals, each having an 8-bit width, into y, m and c signals each of which has the lesser number of bits. The re-quantized y, m and c signals are inputted to a black signal generation unit 309 for newly generating a black record signal K and also correcting the inputted y, m and c signals into y', m' and c' signals to be actually used as record data. Then, a record apparatus 310 forms a visual image.

A third embodiment of the present invention adapted to make the pseudo-half-tone processing into binary data will now be described with reference to FIG. 20. The pseudo-half-tone processing technique used in this embodiment is one already proposed, the configuration of which is mainly divided into a memory 307 for delaying and holding the binary data by 2 lines which have been already binary-coded, a binarization unit 360 for holding the binary data outputted on a pixel by pixel basis from the memory 307 in units of 12 pixels adjacent the pixel of interest, determining a binary threshold from those 12 binary data for binarization, and producing a binarization error, an error memory 305 for delaying and holding the error by 1 line, and an error correction unit 304 for correcting the input image signal based on the error.

<Binarization Unit 360>

Figure 21:
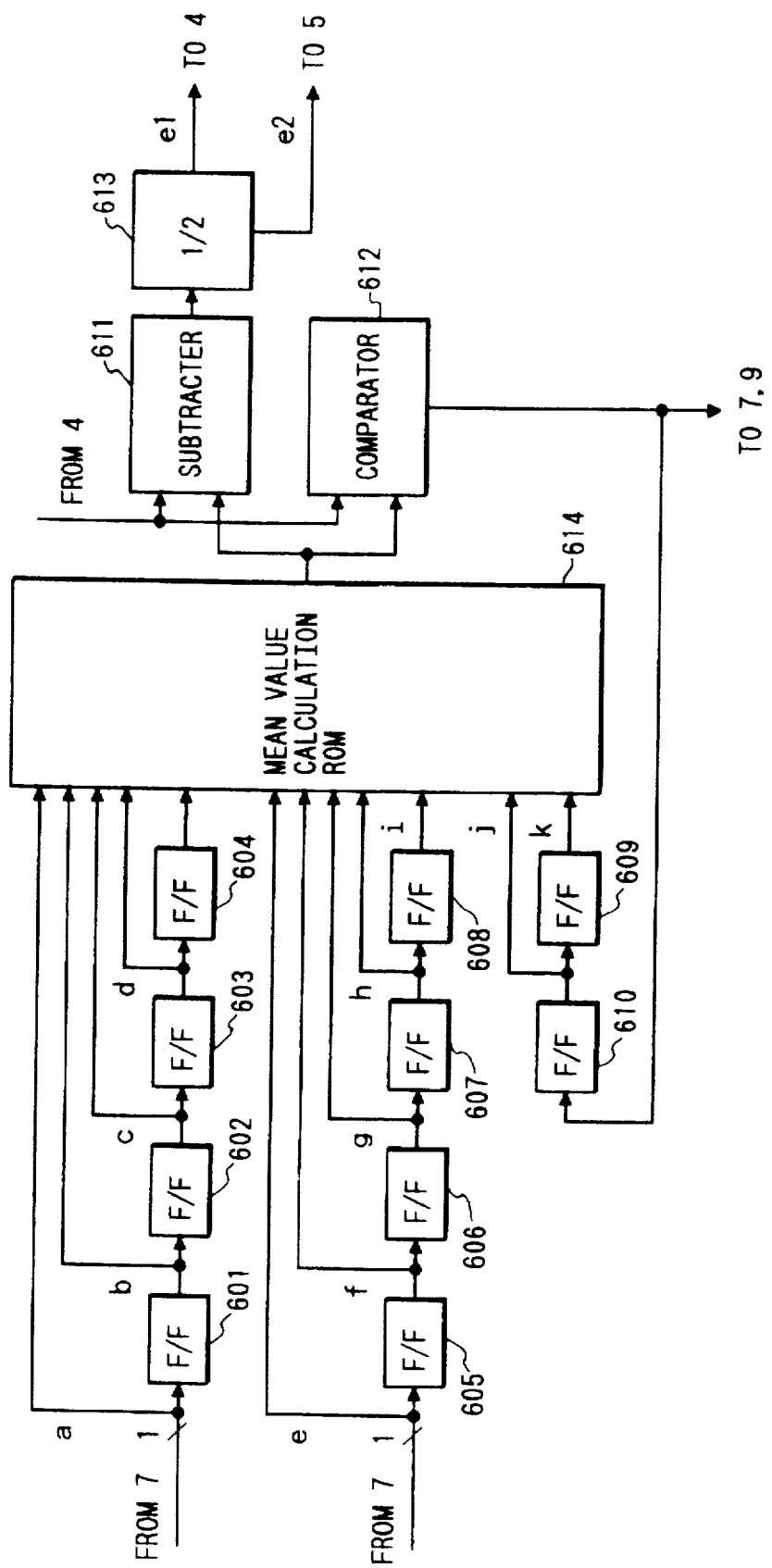
FIG. 21 is a view showing a binarization unit 360.

Details of the binarization unit 360 will be explained with reference to FIGS. 21 and 22. In FIG. 21, F/F's 605 and 601 respectively receive the binary data of preceding 1 line and 2 lines from the line of interest which is delayed and held by the memory 307. In response to the data clock (not shown), the received binary data are successively delayed and held on a pixel by pixel basis by F/F's 602, 603, 604 and F/F's 606, 607, 608. On the other hand, an output of an F/F 610 which receives the result of binarizing the pixel of interest is also delayed and held by an F/F 609. Letting input and output signals of the respective flip-flops be designated by a–k as illustrated, there are obtained 12 data which have been already binary-coded and two-dimensionally adjacent the position * of the pixel of interest as shown in FIG. 22.

Figure 22:
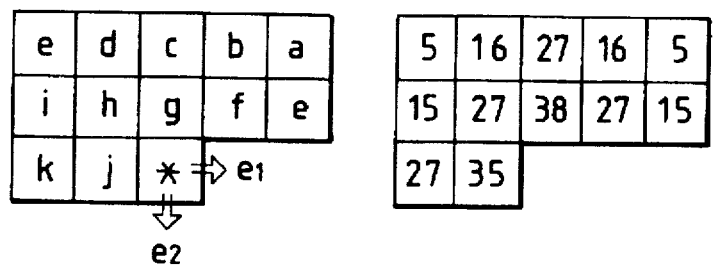
FIG. 22 is a view for explaining a manner of the binarization.

In FIG. 21, a mean value calculation ROM 614 having input address terminals, to which the above 12 binary data are connected, is a ROM for multiplying the pixels at the positions a–j by weighting factors to be applied to the binary data at the positions a–j with respect to the pixel of interest, as shown in FIG. 22, for conversion into a weighted mean value. This weighted mean value outputted from the ROM 614 becomes a threshold for binarizing the pixel of interest. A comparator 612 serves to binary-code the input data of which error has been corrected by the error correction unit (described later). The binary-coded result is inputted to both the memory 307 and the F/F 610 for binarization of a next pixel. Meanwhile, the output of the mean value calculation ROM 614 is also applied to a subtracter fill to determine the difference between the mean value and the input data after error correction. An output of the subtracter 611 gives an binarization error specific to the present pseudo-half-tone processing technique unlike the well-known error dispersing technique. The binarization error is divided into two equal parts by an alloter 613, following which one half e2 is inputted to the error memory 305 for correction of next line pixel data and the other half e1 is inputted to the error correction unit 304 for correction of next pixel data.

<Error Correction Unit 304>

Figure 23:
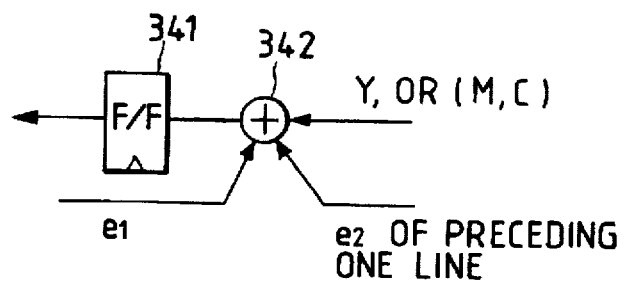
FIG. 23 is a view showing-a configuration of an error correction unit 304.

The error correction unit 304 is shown in FIG. 23. The input 8-bit image data is added in an adder 342 with both the binarization error e1 occurred during binarization of the last pixel and the binarization error e2 outputted from the error memory 305, i.e., occurred during binarization of the pixel of preceding 1 line. The input data after error correction is applied to an F/F 341 and, in response to the next clock, then applied to the subtracter 611 and the comparator 612, followed by execution of the binarization processing similar to the above.

The above binarization processing is executed in parallel for the three color data of C, M and Y independently of each other in a like manner, thereby obtaining the binary data y', m' and c'.

<Generation of Black Signal>

An output of an AND gate 309K receiving the y', m' and c' signals gives a black signal k to be recorded. Outputs of AND gates 9Y, 9M and 9C respectively receiving the black signal k and the y', m' and c' signals give the y, m and c signals as record color signals.

Figure 24:
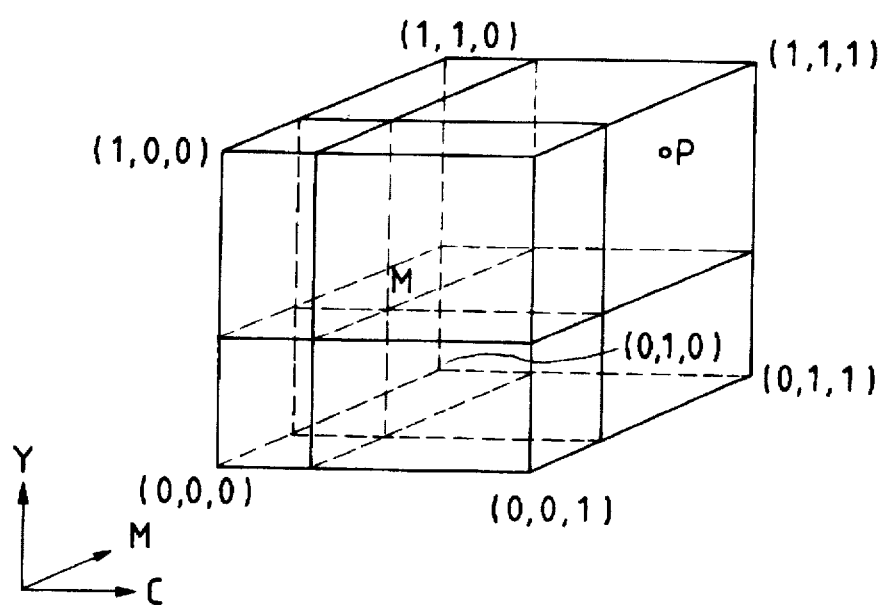
FIG. 24 is a view showing a YMC color space.

That process will now be explained by referring to a YMC color space shown in FIG. 24. Assuming that the binary-coded threshold (mean value) resulted from those of every pixels in the YMC space is M, the space is divided into eight parts in the directions of three YMC axes. Now, if the input data after error correction is present at a position P, the binary-coded results of the three colors all become "1". Therefore, the black to be otherwise recorded by three colors is replaced with only one color K which can be expressed using an ⅓ amount of recording material. Eventually, the recording can be made by recording materials of two colors at maximum. In other words, it is possible to use seven colors of Y, M, C, K, Y+M, M+C and C+Y as record colors per pixel.

A modification of the black signal generation unit 309 in the third embodiment will be next explained.

<Modification (1) of Black Signal Generation Unit>

FIG. 25 shows a modification of the black signal generation unit. In FIG. 25, designated by 391 is a min value detection unit for receiving the Y, M and C data and determining the minimum value among them. The resulting minimum value is compared in a comparator 392 with a certain constant α preset by a CPU (not shown). If the minimum value is larger than α, then a level "1" is outputted to an AND gate 390. Specifically, because the minimum value of the Y, M and C signals indicates brightness of the input pixel, some level of brightness, i.e., the case of the minimum value being smaller than α, implies that record dots are not so dense in the vicinity of the pixel of interest. Thus, there is no need of displacement with only one color of the K signal. On the contrary, it is possible to prevent the obtrusive texture which would be caused by the replaced K dots.

In addition, the similar advantage can be also obtained by using the mean value of Y, M and C, for example, other than the minimum value.

<Modification (2) of Black Signal Generation Unit>

Figure 26B:
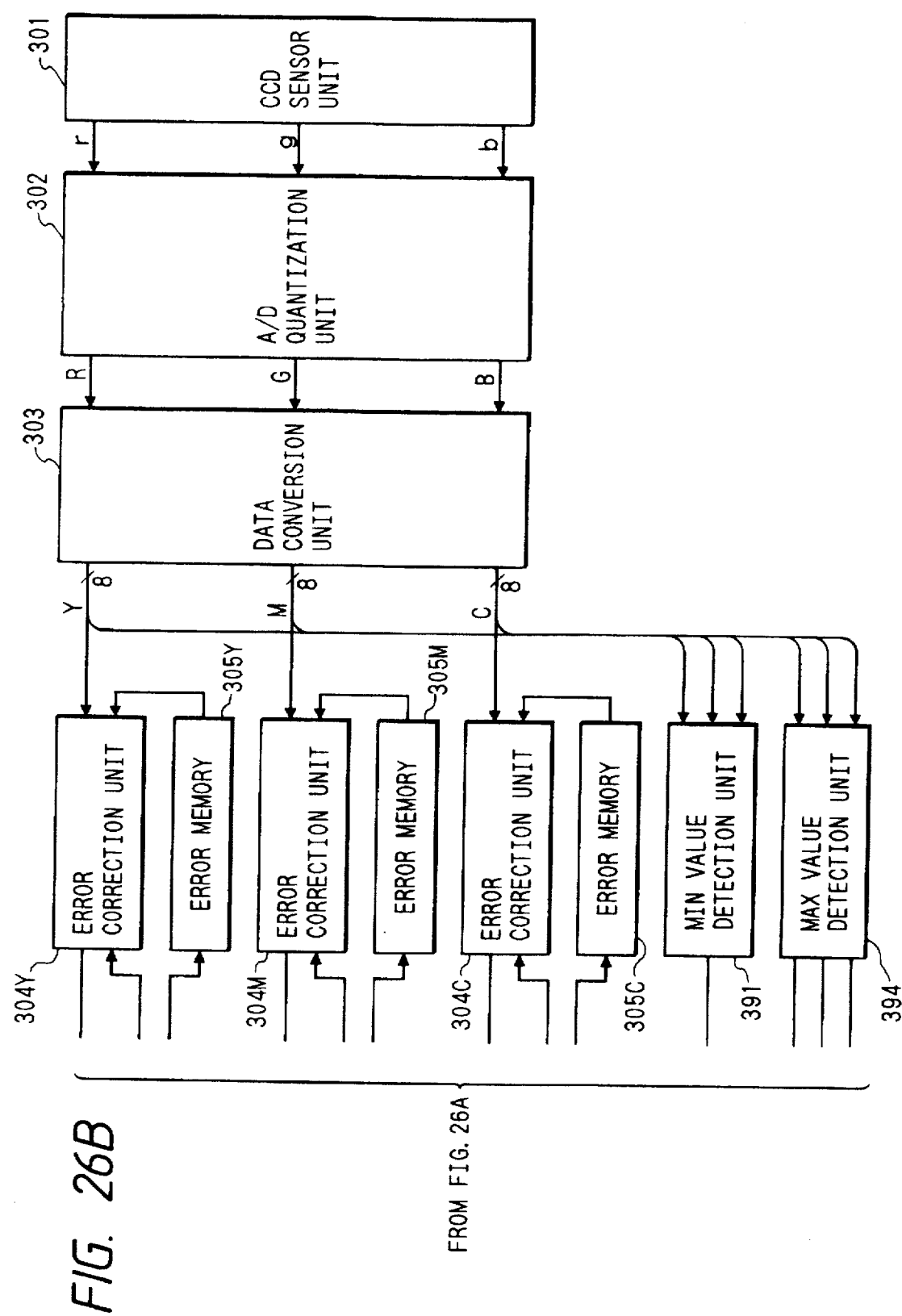

While blackish portions in the input image are replaced with nearly only one K color in the above embodiment and modification, the record image can exhibit deepness by adding dots of another color to the K color. In a modification shown in FIG. 26, when a comparator 393 detects the presence of the minimum value smaller than a preset value β which is larger than α), a max value detection unit 394 detects the color having a maximum value. In this case, the black is expressed by using a total of two colors; i.e., the K color and the color of the maximum value. More specifically, in the case of c', m' and y' being all "1" at the AND gate 390, when the comparator 393 detects the minimum value exceeding 62, an AND gate 396 produces an output of "1", while the max value detection unit 394 produces an output of "1" in only the color of the maximum value. As a result, one of AND gates 397c, 397m, 397y produces an output of "1", allowing a dot to be recorded in one color + the K color.

The color for use in recording in addition to black is not limited to the color of the maximum value and may be the color of the minimum value or one fixed color such as magenta or cyan. Particularly, in the case of using cyan, even if there occurs a shear between black and cyan dots, the shear can be less visually recognized. From this standpoint, cyan is superior to magenta.

Furthermore, instead of using another color in addition to black, the black may be used twice in superposed relation. This alternative is advantageous in that since there is no problem of a color shear, dots are not always required to superpose therebetween at the same position.

The above method of superposing multiple dots enables black characters to be expressed more clearly, and is effective in, particularly, an ink jet printer or the like in which the specific density of black ink on recording paper cannot be increased beyond a certain level.

<Modification (3) of Black Signal Generation Unit>

Figure 27B:
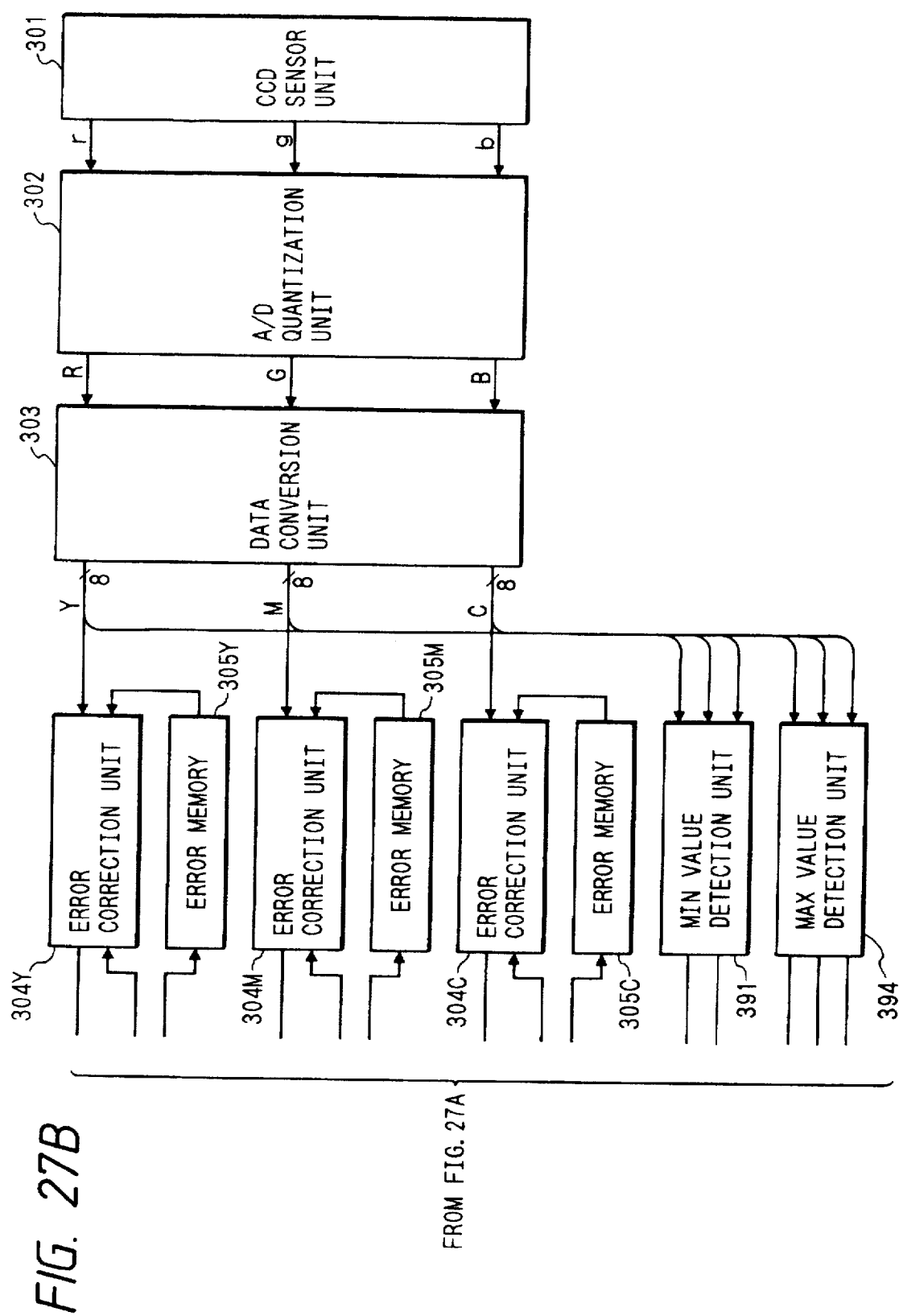

By combining the modifications (1) and (2) with each other, the recording can be made with higher quality. More specifically, as shown in FIG. 27, the black signal generation unit of this modification is designed to meet the following relationships of Table 2 when c', m' and y' are all at "1".

TABLE 2

| Conditions | c | m | y | k |
|---|---|---|---|---|
| min (U, M, C) < α | 1 | 1 | 1 | 0 |
| α < min (Y, M, C) < β | 0 | 0 | 0 | 1 |
| min (Y, M, C) > β | (only color of max (Y, M, C) 1) | | | 1 |

By so setting, it is possible to make the recording almost in two colors.

Note that the pseudo-half-tone processing used is not limited to the illustrated embodiment, the similar advantage to this embodiment of the present invention can be also obtained by employing the error dispersing technique or the like.

Figure 28B:
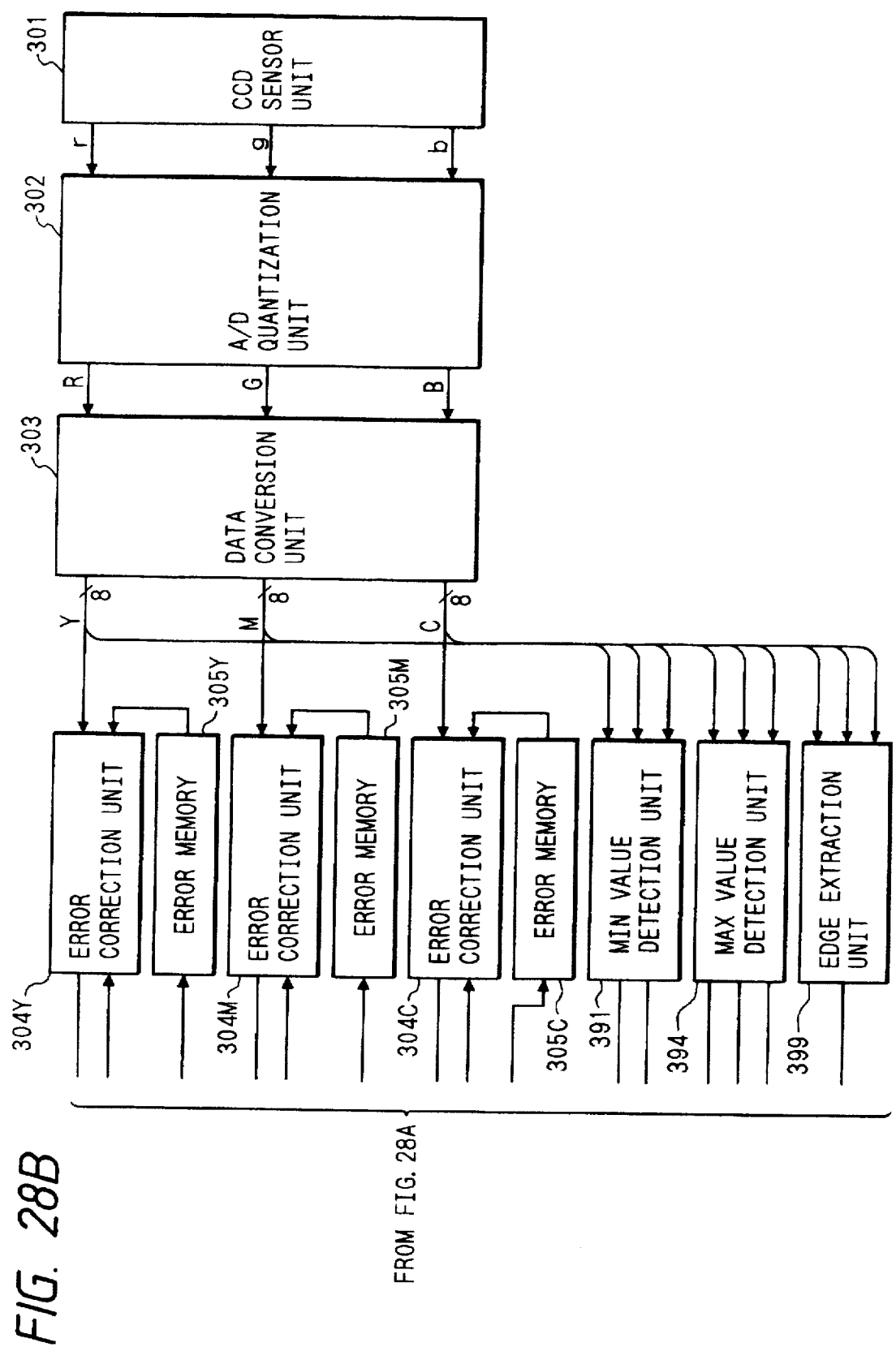

An edge may further be extracted in addition to detection of the color of the maximum value. More specifically, as shown in FIG. 28, a well-known edge extraction unit 399 may be provided to inhibit the recording in two colors when an edge is detected depending on a 1-bit judgment signal (1 indicating the presence of edge, 0 indicating the absence of edge). This enables it to prevent a color shear which may occur at edges.

<Record Apparatus 310>

The construction of the record apparatus 310 in FIG. 19 is similar to that shown in FIGS. 10 to 12.

This embodiment of the invention Is applicable to various recording techniques such as ink jet recording, thermal transfer recording, electrostatic recording and electrophotographic recording.

With this embodiment, the RGB input image data are color-separated into three record colors of C, M and Y, the resulting image data in three colors are independently subjected to the pseudo-half-tone processing for re-quantization, and record data in four colors of c, m, y and k are produced based on the re-quantized data, making it possible to control the amounts of all kinds of recording materials to be recorded on one point over the surface of recording paper.

In other words:

(1) The number of color dots to be recorded on one point over the surface of recording paper can be 1 limited nearly to two colors among the four colors of C, M, Y and K, with the result of high-quality recording.

(2) As compared with the case of independently producing the K signal by the use of masking and UCR for binarization, the binarization circuit in one color can be dispensed with and the apparatus can be thus realized inexpensively.

This embodiment of the invention comprises means for making a plurality of color component signals subjected to pseudo-half-tone processing color by color for binarization, means for removing minor color components from the color component signals, and means for generating record color signals by using both the color component signal left after removing the minor color components and the color component signals before the binarization, thereby improving color reproducibility of black line image portions, in particular.

As printers to output the record signals generated in an above-stated manner, there can be used such printers capable of color recording as a color ink jet printer, a color thermal transfer printer, a color dot printer and a color laser beam printer.

In particular, the present invention represented by the second embodiment is also effective for use in a printer having a head of the type that droplets are discharged by utilization of film boiling under thermal energy, as disclosed in U.S. Pat. No. 4,723,129 and U.S. Pat. No. 4,740,796.

The aforementioned arithmetic circuits may be constituted using ROM's, RAM's or the like, or may be realized by a software executed in a computer to implement the above arithmetic operations.

Other than being applied from the CCD sensor, the image data may be applied from host computer through an interface, or from an external storage unit.

The binarization processing is not limited to that disclosed in the above embodiment and may be implemented by the error dispersing technique or the like pseudo-half-tone processing, or any other suitable binarization processing.

In additions this embodiment is not limited to binarization and input n bits may be coded into any value ranging from 0 to m (where $2 \leq m < n$).

According to the third embodiment of the present invention, as explained above, there can be provided an image processing apparatus which has satisfactory reproducibility of colors.

The present invention is not restricted to the embodiments explained above, and various modifications and applications can be made without departing from the scope of the attached claims.

What is claimed is:

1. An image processing apparatus comprising:
   a) input means for inputting a plurality of color component signals for each pixel;
   b) first discrimination means for discriminating whether or not a pixel of interest has a predetermined color, based on the color component signals;
   c) second discrimination means for discriminating whether or not the pixel of interest belongs to a line image portion, based on the color component signals;
   d) first judgement means for judging whether or not the pixel of interest belongs to a line image portion of the predetermined color, based on the discrimination results of said first and second discrimination means, a result of said first judgement means being positive when the pixel of interest belongs to the line image portion of the predetermined color and being negative when the pixel of interest does not belong to the line image portion of the predetermined color;
   e) second judgement means for judging whether or not the pixel of interest is outside a line image portion of the predetermined color but in the vicinity of a pixel which belongs to a line image portion of the predetermined color, based on the discrimination results of said first and second discrimination means, a result of said second judgement means being positive when the pixel of interest is outside the line image portion of the predetermined color, but in the vicinity of the pixel which belongs to a line image portion, and being negative when not in the vicinity of a pixel which belongs to a line image portion of the predetermined color; and
   f) control means for controlling recording of the pixel of interest (i) in a first manner, when the result of said first judgement means is positive, (ii) in a second manner, when the result of said second judgement means is positive and the result of said first judgement means is negative, and (iii) in a third manner when the results of both the first and the second judgement means are negative.

2. An image processing apparatus according to claim 1, wherein said first and second judgment means make judgment using data of pixels surrounding the pixel of interest.

3. An image processing apparatus according to claim 1, wherein said control means controls in the first manner to make recording by using only black, when said first judgment means judges that the pixel of interest belongs to a black line image portion.

4. An image processing apparatus according to claim 1, wherein said controls in the second manner means control to make recording by using no record colors other than black, when said second judgment means judges that pixels in the vicinity of the pixel of interest belong to a black line image portion.

5. An image processing apparatus according to claim 1, further comprising image forming means which performs image forming under control by said control means.

6. An image processing apparatus according to claim 5, wherein said image forming means includes a head of the type that liquid droplets are discharged by utilization of film boiling with thermal energy.

7. An image processing method comprising:
   a) an input step of inputting a plurality of color component signals for each pixel;
   b) a first discrimination step of discriminating whether or not a pixel of interest has a predetermined color, based on the color component signals;

c) a second discrimination step of discriminating whether or not the pixel of interest belongs to a line image portion, based on the color component signals;

d) a first judgement step of judging whether or not a pixel of interest belongs to a line image portion of the predetermined color, based on the discrimination results of said first and second discrimination steps, a result of said first judgement step being positive when the pixel of interest belongs to the line image portion of the predetermined color and being negative when the pixel of interest does not belong to the line image portion of the predetermined color;

e) a second judgement step of judging whether or not the pixel of interest is outside a line image portion but in the vicinity of a pixel which belongs to a line image portion of the predetermined color, based on the discrimination results of said first and second discrimination steps, a result of said second judgement step being positive when the pixel of interest is outside the line image portion of the predetermined color, but in the vicinity of the pixel which belongs to a line image portion, and being negative when not in the vicinity of a pixel which belongs to a line image portion of the predetermined color; and f) a control step of controlling recording of the pixel of interest (i) in a first manner, when the result of said first judgement step is positive, (ii) in a second manner, when the result of said second judgement step is positive and the result of said first judgement step is negative, and (iii) in a third manner when the results of both the first and the second judgement steps are negative.

8. An image processing method according to claim 7, wherein in said first and second judgment steps, the judgment is made using data of pixels surrounding the pixel of interest.

9. An image processing method according to claim 7, wherein in said control step, control is performed to make recording by using only black when said first judgment step judges that the pixel of interest belongs to a black line image portion.

10. An image processing method according to claim 7, wherein in said control step, control is performed to make recording by using no record colors other than black when said second judgment step judges that pixels in the vicinity of the pixel of interest belong to a black line image portion.

11. An image processing method according to claim 7, further comprising a step of forming an image under control by said control step.

12. An image processing method according to claim 11, wherein said image forming is performed by using a head of the type that liquid droplets are discharged by utilization of film boiling with thermal energy.

13. An image processing apparatus comprising:

a) input means for inputting a plurality of input color component signals for each pixel, each of the input signals corresponding to a different color and having n levels;

b) processing means for processing the plurality of input color component signals having n levels, and outputting a plurality of processed color component signals, each of the processed signals having m levels (where $2 \leq m < n$/ and being used for forming an image;

c) judgement means for judging whether or not an image represented by the plurality of input color component signals belongs to a line portion of a predetermined color based on a combination of the input color component signals having n levels, and for generating a multivalue judgement signal which represents a judgement result; and d) control means for controlling, based on the judgement result by said judgement means, image forming with the plurality of processed color component signals having m levels, which have been output by said processing means.

14. An image processing apparatus according to claim 13, wherein said processing means outputs the processed color component signals, each having m levels, in consideration of an error in quantization.

15. An image processing apparatus according to claim 13, wherein said color component signals are color component signals of yellow, magenta and cyan.

16. An image processing apparatus according to claim 13, further comprising image forming means which performs image forming under control by said control means.

17. An image processing apparatus according to claim 16, wherein said image forming means includes a head of the type that liquid droplets are discharged by utilization of film boiling with thermal energy.

18. An apparatus according to claim 13, wherein said image processing apparatus comprises a color printer.

19. An image processing method comprising the steps of:

a) inputting a plurality of input color component signals for each pixel, each of the input signals corresponding to a different color and having n levels;

b) processing the plurality of input color component signals having n levels, and outputting a plurality of processed color component signals, each of the processed signals having m levels (where $2 \leq m < n$) and being used for forming an image;

c) judging whether or not an image represented by the plurality of input color component signals belongs to a line portion of a predetermined color based on a combination of the input color component signals having n levels, and generating a multivalue judgement signal which represents a judgement result; and d) controlling, based on the judgement result in said judging step, image forming with the plurality of processed color component signals having m levels, which have been output in said processing step.

20. A method according to claim 19, wherein said processing step outputs the processed color component signals, each having m levels, in consideration of an error in quantization.

21. A method according to claim 19, wherein the color component signals are color component signals of yellow, magenta and cyan.

22. A method according to claim 19, further comprising an image forming step of performing image forming under control of said controlling step.

23. A method according to claim 22, wherein in said image forming step includes a head of the type that liquid droplets are discharged by utilization of film boiling with thermal energy is utilized.

24. A method according to claim 19, wherein said image processing method comprises a process performed in a color printer.

* * * * *

UNITED STATES PATENT AND TRADEMARK OFFICE
CERTIFICATE OF CORRECTION

| | | |
|---|---|---|
| PATENT NO. : | 5,729,624 | Page 1 of 4 |
| DATED : | March 17, 1998 | |
| INVENTOR(S) : | TANIOKA ET AL. | |

It is certified that error appears in the above-identified patent and that said Letters Patent is hereby corrected as shown below:

ON THE COVER PAGE

AT [56] References Cited:

FOREIGN PATENT DOCUMENTS, "2022027" should read --2-22027--.

COLUMN 2:

Line 1, "signal" should read --signals--.

COLUMN 3:

Line 7, "Into" should read --into--.
    Line 17, "after-removing" should read --after removing--.

COLUMN 4:

Line 6, "showing-a" should read --showing a--.
    Line 44, "on-the" should read --on the--.

COLUMN 5:

Line 15, "where" should read --(where--.
    Line 17, "constant)" should read --constant).--.
    Line 26, "Larger" should read --larger--.

UNITED STATES PATENT AND TRADEMARK OFFICE
CERTIFICATE OF CORRECTION

PATENT NO. : 5,729,624
DATED : March 17, 1998
INVENTOR(S) : TANIOKA ET AL.

It is certified that error appears in the above-identified patent and that said Letters Patent is hereby corrected as shown below:

COLUMN 6:

Line 17, "from,high-accurately" should read --from high-accurately--;

COLUMN 7:

Line 45, "Like-wise," should read --Likewise,--.
    Line 56, "outputs—of" should read --outputs of--.

COLUMN 8:

Line 50, "Signals" should read --signals--.

COLUMN 9:

Line 10, "(0,0,1)  K=1, C=M=Y=0" should read --(0,0,1)  K=0, C=M=Y=0".

COLUMN 10:

Line 58, "wax" should read --max--.

COLUMN 11:

Line 6, "be-described" should read --be described--.

UNITED STATES PATENT AND TRADEMARK OFFICE
CERTIFICATE OF CORRECTION

PATENT NO. : 5,729,624
DATED : March 17, 1998
INVENTOR(S) : TANIOKA ET AL.

It is certified that error appears in the above-identified patent and that said Letters Patent is hereby corrected as shown below:

COLUMN 12:

Line 18, "can-be" should be --can be--.

COLUMN 13:

Line 5, "a" should read --an--.
    Line 66, "pine" should read --pixel--.

COLUMN 15:

Line 17, "982-3" should read --282-3--.

COLUMN 16:

Line 32, "except-that" should read --except that--.

COLUMN 17:

Line 66, "cats" should read --data--.

COLUMN 20:

Line 44, "min $(U,M,C)<\alpha$" should read --min $(Y,M,C)<\alpha$--.

UNITED STATES PATENT AND TRADEMARK OFFICE
CERTIFICATE OF CORRECTION

PATENT NO. : 5,729,624
DATED : March 17, 1998
INVENTOR(S) : TANIOKA ET AL.

It is certified that error appears in the above-identified patent and that said Letters Patent is hereby corrected as shown below:

COLUMN 21:

Line 1, "Is" should read --is--.
    Line 17, "1" should be deleted.
    Line 57, "additions" should read --addition,--.

COLUMN 22:

Line 49, "controls in the second manner means control" should read --control means controls in the second manner--.

COLUMN 23:

Line 64, "$2 \leq m < n /$" should read --$2 \leq m < n)$--.

Signed and Sealed this

Fifteenth Day of June, 1999

Attest:

Q. TODD DICKINSON

*Attesting Officer*     *Acting Commissioner of Patents and Trademarks*